(12) United States Patent
Graves

(10) Patent No.: US 7,088,919 B2
(45) Date of Patent: Aug. 8, 2006

(54) MODULAR PHOTONIC SWITCH WITH WAVELENGTH CONVERSION

(75) Inventor: Alan F. Graves, Kanata (CA)

(73) Assignee: Nortel Networks Limited, St-Laurent (CA)

( * ) Notice: Subject to any disclaimer, the term of this patent is extended or adjusted under 35 U.S.C. 154(b) by 708 days.

(21) Appl. No.: 10/286,781

(22) Filed: Nov. 4, 2002

(65) Prior Publication Data

US 2004/0091198 A1 May 13, 2004

(51) Int. Cl.
*H04J 14/00* (2006.01)
(52) U.S. Cl. .......................... 398/50; 398/56
(58) Field of Classification Search ............. 398/48, 398/49, 50, 51, 55, 56, 57
See application file for complete search history.

(56) References Cited

U.S. PATENT DOCUMENTS

2004/0153492 A1* 8/2004 Cao et al. ............... 709/200

OTHER PUBLICATIONS

LambdaRouter™ All Optical Switch, Lucent Technologies, Bell Labs Innovations, downloaded from www.lucent.com on Oct. 21, 2002.
Chip Technology Adopted in Optical Switches, http://neasia.nikkeibp.com/nea/20011/comnet 152107.html, Oct. 21, 2002.

* cited by examiner

*Primary Examiner*—Christina Y. Leung

(57) ABSTRACT

A switch for optical signals, including a plurality of external inputs, a plurality of external outputs, a wavelength conversion entity and a plurality of core switching entities. Each core switching entity is associated to a respective set of at least two wavelengths. The approach is based on switching groups of at least two wavelengths in each core switching entity, while still maintaining per-wavelength switching granularity but sharing the provided capacity for wavelength conversion connections across the group. Thus, wavelength conversion resources assigned to a group of wavelengths are usable by any wavelength in that group. In this way, the blocking statistics in the node as a whole are improved with respect to a single-wavelength-plane configuration. In addition, the resulting switch is modular as it can be upgraded by adding or removing one or more switching modules as required.

22 Claims, 15 Drawing Sheets

MODULAR PHOTONIC SWITCH WITH WAVELENGTH CONVERSION

CROSS-REFERENCES TO RELATED APPLICATIONS

The present invention is related in subject matter to the following U.S Patent Applications, hereby incorporated by reference herein in their entirety:

Ser. No. 09/511,065, entitled "Switch for Optical Signals" to Graves et. al, filed on Feb. 23, 2000;

Ser. No. 09/580,495, entitled "Optical Switch with Power Equalization" to Graves et al., filed on May 30, 2000;

Serial No. 60/207,292, entitled "Optical Switch with Connection Verification" to Graves et al., filed on May 30, 2000;

Ser. No. 09/726,027, entitled "Protection Switching Arrangement for an Optical Switching System" to Graves et. al., filed on Nov. 30, 2000;

Ser. No. 09/742,232, entitled "Gain Determination for Correlation Processes" to Andre Van Schyndel, filed on Dec. 22, 2000;

Ser. No. 09/893,493, entitled "Communications Network for a Metropolitan Area" to Graves et. al, filed on Jun. 29, 2001;

Ser. No. 09/893,498, entitled "Metropolitan Photonic Switch" to Graves et. al, filed on Jun. 29, 2001;

Ser. No. 09/972,989, entitled "Optical Wavelength Plan for Metropolitan Photonic Network" to Graves et. al, filed on Oct. 10, 2001.

FIELD OF THE INVENTION

The present invention relates generally to modular photonic switches with wavelength conversion and, more particularly, to techniques for implementing such switches such as to exhibit desirable blocking performance even when heavily loaded and even when a significant percentage of incoming carriers are required to undergo wavelength conversion.

BACKGROUND OF THE INVENTION

FIG. 1 shows a metropolitan network 100 with modular photonic switching, with a level of lambda conversion, including a set of service aggregation devices 120, a set of edge photonic switch nodes 130, a set of tandem photonic switch nodes 140 and a core 100 comprising a set of core photonic switch nodes 150. An architecture similar to that of FIG. 1 has been described in aforementioned U.S. patent application Ser. No. 09/893,493.

In the metropolitan network 100 shown in FIG. 1, the core photonic switch nodes 150 can provide transport level grooming of sub-lambda-level (and lambda-level) services and can also provide direct service-level switching of lambda-level services. Furthermore, the core photonic switch nodes 150 can include sub-lambda-granular service-level switches 160 such as core routers (or packet switches), core ATM switches and core TDM switches to provide centralized switching of services at less than an entire lambda capacity. The service aggregation devices 120 are adapted to aggregate packet traffic (destined for a core router or packet switch), ATM traffic (destined for a core ATM switch), and TDM traffic (destined for a core TDM switch) into separate optical carriers, in order to simplify the core 110 and prevent core node capacity explosion. This segregation also allows the optical carriers to be fed directly into the appropriate sub-lambda-granular service-level switch 160 by the core nodes. Alternatively, multiple service types may share a common optical carrier, in which case a stage of electronic sub-wavelength switching should be interposed between the core nodes 150 and the sub-lambda-granular service-level switches 160 in order to route different components of the common optical carrier to different ones of the sub-lambda-granular service-level switches 160.

Each of the photonic switch nodes 130, 140, 150, includes a photonic switch and an optical carrier conditioning/validation sub-system (not shown in FIG. 1) for providing wavelength-level switching of optical signals. Thus, the metropolitan network 100 provides switchable express photonic pipes between the service aggregation systems 120 and the core 110. By using this photonic lambda switching architecture, in conjunction with electro-optical sub-lambda switching nodes at the core locations, the complexity of the electronic and electro-optic components of the network 100 is fundamentally minimized, requiring only one stage of electronic multiplexing, one stage of electro-optic conversion, one stage of opto-electronic conversion on the way to the service-level switch 160, one stage of service-level switching within the metro area, and then a return path to the far end metro customer. This leads to a much lower cost and complexity for the electro-optic and electronic parts of the network 100 but introduces the requirement for a photonic infrastructure. As such, the electronic and electro-optic complexity of the network 100 is fundamentally minimized through the use of photonic functionality to provide the appropriate connections.

In addition, the use of photonic paths that completely bypass the electronic and electro-optic components of the core nodes will permit the establishment of all-photonic end-to-end switched connections. Initially, it is expected that such end-to-end photonic paths will be very uncommon, due to the extreme bandwidth requirements to make them economically practical, the prove-in currently being situated at about 3 to 4 gigabits per second (Gb/s) per connection. However, as time progresses and optical integration becomes practicable, the prove-in is expected to drop to around 150 Mb/s, at which point many end-to-end transport pipes can be directly provisioned in a photonic fashion. The provisioning of end-to-end optical transport pipes will require an ability to change the wavelengths of optical carriers in the network, i.e., to move optical carriers from one wavelength slot to another, analogous to moving timeslots in a TDM switched network. This process, often called wavelength (or lambda) conversion, is required at some, but not necessarily all network nodes.

With continued reference to the network 100 in FIG. 1, each core node 150 includes a wavelength-level switch 155 and one or more (electrical) service-level switches 160 such as IP/packet switches, TDM/SONET switches and STS cross-connects. In addition, the core photonic switch nodes 150 may include or otherwise be connected to legacy equipment such as the TDM telephony network, and provide connectivity to long haul (LH) gateways. At least two core photonic switch nodes 150 are typically required in the network 100 and usually a greater number are provided. Exactly two core photonic switch nodes 150 give survivability, while more than two give scalability and offer protection savings.

The core photonic switch node 150 serves not only to connect each incoming wavelength to the appropriate sub-lambda-granular service-level switch 160 for a given wavelength payload, but also to select the correct capacity port on that sub-lambda-granular service-level switch 160 so as to avoid stranding core resources. As such, the wavelength-level switch 155 of the core photonic switch node 150 provides wavelength-level connectivity between buildings and electronic protocol-specific or service-specific boxes. Otherwise, the provisioning granularity would be at the fiber level, precluding the advantageous use of dense wavelength division multiplexing and demultiplexing. By the same token, exploitation of the wavelength-level switch 155 to its full potential requires some level of segregation with respect to the wavelengths traveled by IP and TDM traffic within the network 100. It is also noted that the wavelength-level switch 155 may provide dynamic network load balancing and protection in case of network failures.

Regarding the edge photonic switch nodes 130, these provide the ingress and egress points into the metropolitan network 100. The edge photonic switch nodes 130 are typically located in office buildings, although they may appear elsewhere. The optical signals migrate from sparse DWDM (S-DWDM) into DWDM by an interleaving process and continue their path across the network 100 (see above-mentioned U.S. patent application Ser. No. 09/893,498 and U.S. patent application Ser. No. 09/972,989). The location where the access (S-DWDM) plant meets the inter-office plant is the edge Central Office. The edge photonic switch nodes 130 can be planar in nature, since there is no substantial need for wavelength conversion anywhere but in the core 110. Wavelength conversion is only applied in the case of intra-metro end-to-end wavelength circuits and this can be done in the tandem photonic switch nodes 140 or in the core photonic switch nodes 150. Initially, only rarely will the lack of wavelength conversion capability at the edge node 130 result in a wavelength that could have been locally switched being sent to a wavelength-conversion-equipped node instead, although the prevalence of this occurrence will increase somewhat over time. However, the changed community of interest statistics of the evolved data network, relative to the old telephony network (with its preponderance of local calling), means that the lack of local lambda conversion to complete a local photonic connection and the consequent need for back-haul to a node that does have lambda conversion does not become a problem, since only a relatively small percentage of traffic will be back-hauled when it could have been locally converted.

For its part, a tandem photonic switch node 140 provides a number of functions including a further point of partial fill consolidation before reaching the core 110, establishing end-to-end wavelength paths with wavelength conversion where required and providing a flexibility point for the addition of more core photonic switch nodes 150 or edge photonic switch nodes 130 without having to add dedicated core-edge paths. In addition, the tandem photonic switch nodes 140 may also operate in concert with the edge photonic switch nodes 130 and core photonic switch nodes 150 to provide dynamic traffic load balancing, protection and restoration functions against equipment failure or cable cuts in the core network. A level of wavelength conversion in the tandem photonic switch nodes 140 is beneficial in order to accommodate back-hauled intra-metro wavelength services without routing them back to the core photonic switch nodes 150. All other services/circuits travel to the core photonic switch nodes 150 since this is where the long haul gateways and the sub-wavelength switching functions are located.

As can be appreciated from the above, there is little need for wavelength conversion anywhere but in the tandem photonic switch nodes 140 and core photonic switch nodes 150. It has been estimated that once the metropolitan network 100 is used exclusively for photonic end-to-end connections, only in the case of about 5–10% of wavelengths will the lack of wavelength conversion capability at an edge photonic switch node 130 result in a wavelength that could have been locally switched being sent to a wavelength-conversion-equipped node instead. Stated differently, an edge photonic switch node 130 would ideally be required to provide about 5–10% wavelength conversion under expected future traffic conditions. On the other hand, analyses have shown that the tandem photonic switch nodes 140 and core photonic switch nodes 150 will need to be able to convert as much as 30% and 70% of their incoming wavelengths, respectively, in order to provide satisfactory performance under expected future traffic conditions, once the network 100 has transitioned to the provision of photonic end-to-end paths. In the meantime, the numbers will be somewhat lower, due to the need to terminate most optical carriers in the electro-optic structure of the core photonic switch node 150.

Furthermore, as the photonic switched network shown as 100 in FIG. 1 evolves and thereby grows to accommodate increased traffic, both the number of nodes and the size of those nodes will have to evolve. Thus, the nodes of a practical network have to be sized both initially and in terms of growth, to the actual network traffic levels of provisioned traffic through each individual node, precluding a "one size fits all" approach or approaches which do not scale well, both up and down in size.

These requirements place a fundamental demand on the nodes to be flexible in terms of overall capacity and to permit both various initial node throughputs and various different growth rates. This can only be achieved with a scalable, modular node since for non-scalable nodes size increase requires a "fork-lift" upgrade with the attendant massive disruption to the network at that node site.

Thus, there exists a need in the industry to provide a modular, scalable photonic switch that exhibits desirable blocking performance on both its through paths and its wavelength conversion paths even when heavily loaded and even when a significant percentage of incoming wavelengths need to be converted.

Some conventional photonic switches can be highly modular but exhibit poor blocking performance, as is the case with the switch described in aforementioned U.S. patent application Ser. No. 09/511,065. Such switches are based on a per-wavelength switching structure and hence are highly modular. However, they only provide sufficient wavelength conversion capability to handle the pure edge photonic switch applications and some hybrid edge-tandem photonic switch nodes up to the case where a few percent of incoming carriers must undergo wavelength conversion. However, the longer-term (and in some cases near-term) tandem photonic switch node and core photonic switch node wavelength conversion capability requirements are beyond the reach of the per-wavelength switch, since the latter exhibits a significant blocking probability, especially when heavily loaded.

Other conventional switches can exhibit superior blocking performance but are highly non-modular and non-scalable. Such is the case with the LambdaRouter™ all-optical switch from Lucent Technologies, which is an any-to-any switch based upon a large 3-D MEMS mirror chamber. The any-to-any property exhibits low blocking. However, such switches generally do not provide a wide range of sizes combined with scalability and modularity, generally requiring either a massively over-provisioned initial switch core or a "fork-lift" upgrade once the core runs out of capacity. These factors, combined with the complexity and expense of achieving a functional solution, have prevented any-to-any switches from achieving practicality.

Clearly, there still exists a need in the industry to provide a modular photonic switch with wavelength conversion that exhibits desirable blocking performance even when heavily loaded and even when a significant percentage of incoming carriers need to undergo wavelength conversion.

SUMMARY OF THE INVENTION

The present invention provides a switch structure which permits all three node types (edge, tandem, core) to be addressed with the same basic technology. The present invention recognizes that a per-wavelength switch structure limits the amount of wavelength conversion that can be performed per input signal of a particular wavelength, which causes blocking to occur at a low switch load.

The approach used by the present invention is based on switching of a few wavelengths as a group within a fundamentally planar, but not wavelength-planar switch, while still maintaining per-wavelength switching granularity but sharing the provided capacity for wavelength conversion connections across the group. Therefore, according to a first broad aspect of the present invention, there is provided a switch for optical signals, including a plurality of external inputs, each external input carrying light that occupies a wavelength associated to that external input. The switch also includes a plurality of external outputs, each external output carrying light that occupies a wavelength associated to that external output. This switch further includes a wavelength conversion entity having a plurality of inputs and a plurality of groups of outputs, each output in each particular one of the groups of outputs carrying light that occupies a wavelength in a group of wavelengths associated to the particular one of the groups of outputs. In addition, the switch includes a plurality of core switching entities, each core switching entity associated to a respective set of at least two wavelengths.

Still in accordance with the first broad aspect of the present invention, each core switching entity is equipped with a plurality of first core inputs respectively connected to those external inputs for which the associated wavelength belongs to the respective set of at least two wavelengths, a plurality of second core inputs respectively connected to those outputs of the wavelength conversion entity belonging to the group of outputs for which the associated group of wavelengths belongs to the respective set of at least two wavelengths, a plurality of first core outputs respectively connected to those external outputs for which the associated wavelength belongs to the respective set of at least two wavelengths; and a plurality of second core outputs respectively connected to individual ones of the inputs of the wavelength conversion entity. In addition, each core switching entity is capable of selectably transferring optical signals from any of its first core inputs to any of its second core outputs and each core switching entity is further capable of selectably transferring optical signals from any of its second core inputs to any of its first core outputs.

By assigning multiple wavelengths to each core switching entity, the blocking statistics in the node as a whole are improved, as demonstrated by computer simulation/modeling results. For a given overall node size, this improvement can be ascribed to the increased number of optical carrier connections in each switch module, combined with the reduction in the number of switch modules as compared to a single-wavelength-plane configuration. Advantageously, the resulting switch is modular because it can be upgraded by adding or removing one or more switching modules as required.

In accordance with a second broad aspect of the present invention, there is provided a method of switching a plurality of incoming optical signals occupying individual wavelengths of light. The method includes grouping the signals into signal groups, each signal group including optical signals occupying at least two wavelengths associated with that signal group; selectably switching each signal in each given signal group towards either an output or a set of wavelength conversion resources associated with the given signal group; and using the set of wavelength conversion resources associated with each given signal group for wavelength conversion of a subset of the incoming signals occupying wavelengths associated with the given signal group. These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

Figure 1:
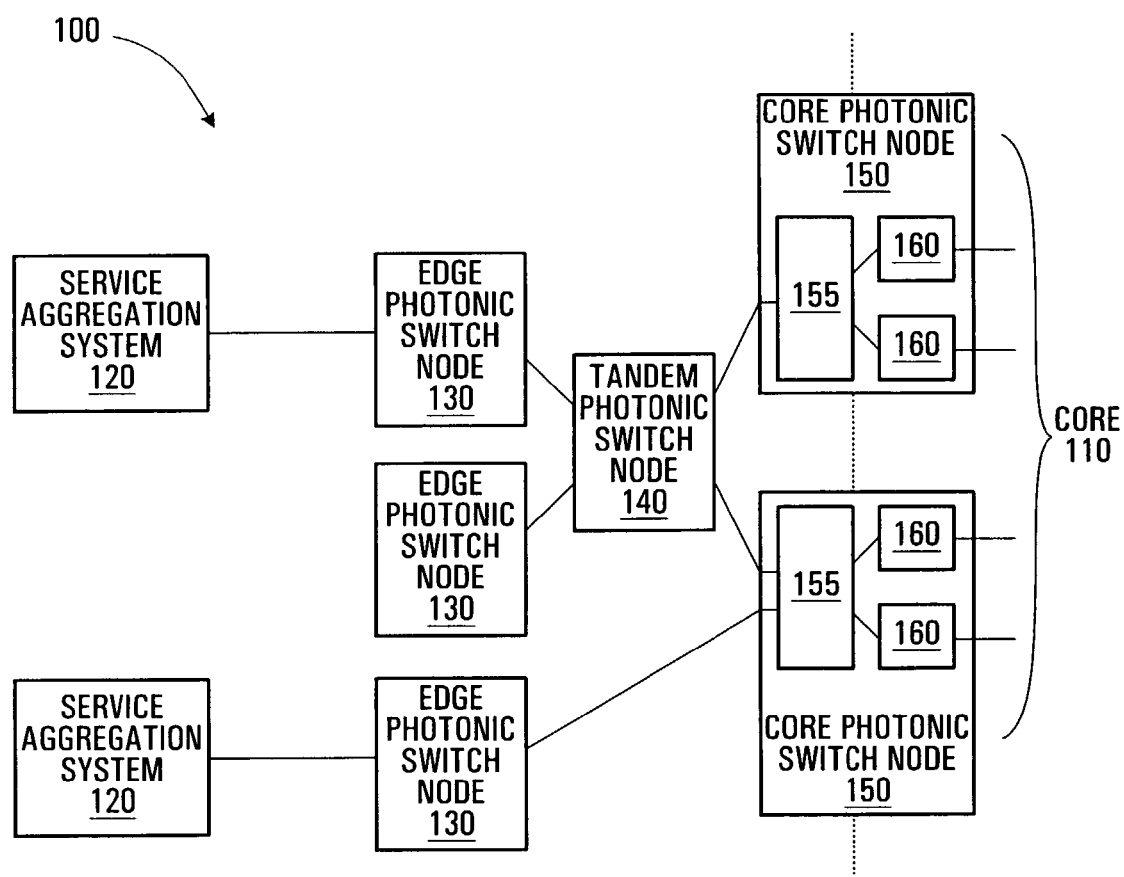
FIG. 1 shows an optical transport network including a plurality of optical switches.
Figure 2:
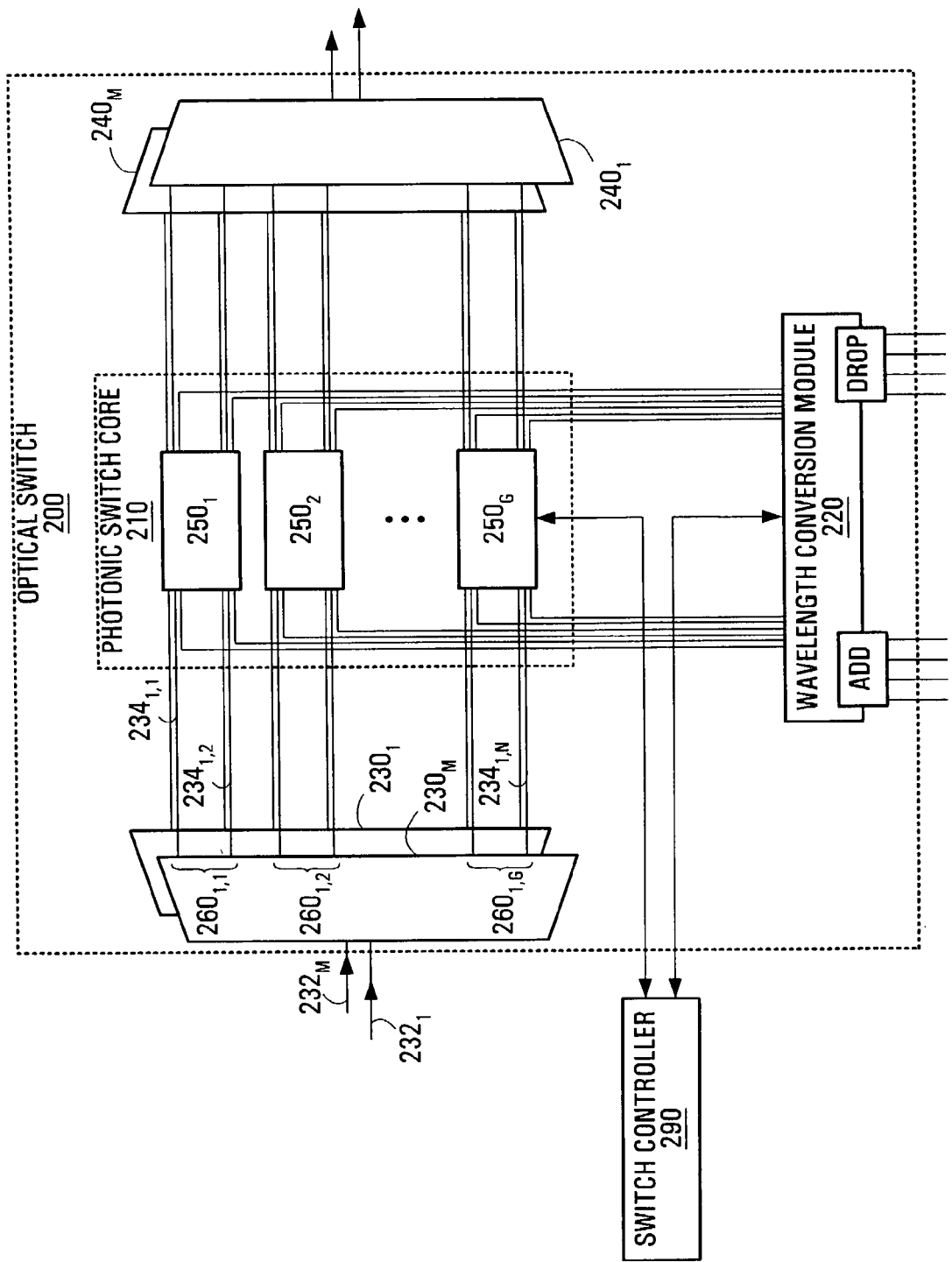
FIG. 2 shows an optical switch in accordance with an embodiment of the present invention, including a photonic switch core and a wavelength conversion module.

With reference to FIG. 2, there is shown an optical switch 200 in accordance with an embodiment of the present invention. The optical switch 200 may be implemented as part of an edge node, a tandem node or a core node. The optical switch 200 includes a photonic switch core 210, which has an arrangement of parallel photonic switching modules $250_{1,2,\ldots,G}$. In a manner to be described later on, each of the switch modules $250_{1,2,\ldots,G}$ handles a subset of the total number of optical carriers passing through the node, with the partitioning among the photonic switching modules $250_{1,2,\ldots,G}$ being made on the basis of groups of optical carrier frequencies, each at a specific wavelength associated with that frequency, which is in turn precisely defined on the network DWDM grid plan. In this disclosure, these will be referred to as "wavelength groups", with the understanding that this refers to groups of optical carriers at frequencies associated with a standard frequency plan, with groups of those carriers falling within each wavelength group. Additionally, the optical switch 200 includes a wavelength conversion module 220, which is fed with optical carrier paths to and from each of the photonic switching modules $250_{1,2,\ldots,G}$ that make up the overall switch core 210.

Also included in the illustrated embodiment of the optical switch 200 is a bank of M wavelength division demultiplexing (WDD) devices $230_{1,2,\ldots,M}$ connected at an input end of the optical switch 200 and which provide an optical demultiplexing function on an incoming DWDM stream so as to permit individual optical carriers to be individually switched by the photonic switch core 210. The individual WDD devices $230_{1,2,\ldots,M}$ are typically distributed amongst a plurality of line cards. The optical switch 200 further includes a bank of M wavelength division multiplexing (WDM) devices $240_{1,2,\ldots,M}$ connected at an output end of the optical switch 200, each of which serves to recombine the switched traffic into a number of DWDM streams for onward transmission. The individual WDM devices $240_{1,2,\ldots,M}$ are also typically distributed amongst a plurality of line cards, which may be the same line cards containing the WDD devices $230_{1,2,\ldots,M}$. The reader will appreciate that the number of WDD devices $230_{1,2,\ldots,M}$, the number of WDM devices $240_{1,2,\ldots,M}$ and the number of line cards may vary depending on the operational requirements of the invention. In fact, it is envisaged that in some embodiments of the invention, one or more of the WDD devices $230_{1,2,\ldots,M}$ and WDM devices 240 can be bypassed.

Each $m^{th}$ WDD device $230_m$, $1 \leq m \leq M$, has a WDD input port $232_m$ for accepting an incoming multi-wavelength optical signal and a total of N WDD output ports $234_{m,1}$, $234_{m,2}, \ldots, 234_{m,N}$. The incoming multi-wavelength optical signal includes a plurality of incoming optical signals occupying individual distinct wavelengths. The WDD device $230_m$ is operative to separate the incoming multi-wavelength optical signal at its WDD input port $232_m$ into its single-wavelength constituent signals. Each of the incoming single-wavelength optical signals so produced is provided at a respective one of the output ports $234_{m,1}$, $234_{m,2}, \ldots, 234_{m,N}$ of the WDD device $230_m$.

For the purposes of this example, the total number of wavelengths occupied by the incoming single-wavelength optical signals in the incoming multi-wavelength optical signal is equal to N (viz. the number of WDD output ports $234_{m,1}, 234_{m,2}, \ldots, 234_{m,N}$ of the WDD device $230_m$), while the specific wavelength occupied by the incoming single-wavelength optical signal emerging at WDD output port $234_{m,n}$ is denoted $\lambda_n$, for $1 \leq n \leq N$. Thus, it can be said that each WDD output port $234_{m,n}$ of WDD device $230_m$ is associated with a distinct wavelength (or color) $\lambda_n$.

The N output ports $234_{m,1}, 234_{m,2}, \ldots, 234_{m,N}$ of the WDD device $230_m$ are divided into G output port groups, each of size N/G (requiring an integer harmonic relationship between N and G), and collectively denoted 260. In particular, output port group $260_{m,g}$ refers to the $g^{th}$ output port group ($1 \leq g \leq G$) on the $m^{th}$ WDD device $230_m$ ($1 \leq m \leq M$). This grouping effectively classifies the WDD output ports of the WDD devices $230_{1,2,\ldots,M}$ as a function of wavelength, such that each output port group corresponds to a distinct set of wavelengths, or "wavelength group". For the sake of convenience, the wavelength groups will hereinafter be referred to as group 1 (for those wavelengths corresponding to output port groups $260_{1,1}, 260_{2,1}, \ldots, 260_{M,1}$), group 2 (for those wavelengths corresponding to output port groups $260_{1,2}, 260_{2,2}, \ldots, 260_{M,2}$), and so on, up to group "G" (for those wavelengths corresponding to output port groups $260_{1,G}, 260_{2,G}, \ldots, 260_{M,G}$).

The WDD output ports corresponding to a given wavelength group, regardless of the WDD device on which they are located, are connected to respective input ports of a common one of a plurality of G wavelength-group photonic switching modules $250_{1,2,\ldots,G}$ in the photonic switch core 210. This means that, for example, the output ports in output port groups $260_{1,g}, 260_{2,g}, \ldots, 260_{M,g}$ are connected to respective input ports of photonic switching module $250_g$, where ($1 \leq g \leq G$). In an example embodiment, there are between 3 and 8 wavelength-group photonic switching modules $250_{1,2,\ldots,G}$ although the present invention is in no way limited to this range.

In some embodiments, (N/G=) two, three or four output ports of each WDD device will lead to the same one of the wavelength-group photonic switching modules $250_{1,2,\ldots,G}$. In the example case where there are four carriers per group and a total of 32 channels in the DWDM grid, this will lead to a requirement for 8 wavelength-group photonic switching modules $250_{1,2,\ldots,8}$. In other embodiments, a greater number of the output ports of each WDD device will lead to the same wavelength-group switching module. In all cases, however, each of the wavelength-group photonic switching modules $250_{1,2,\ldots,G}$ is associated with a group of wavelengths that includes at least two distinct wavelengths of light, i.e., at least two colors (when the light is visible).

It should be appreciated that different numbers of wavelengths may be associated with each group and, within a given group of wavelengths, the associated wavelengths may or may not be neighbouring wavelengths in the optical transmission spectrum. Moreover, the set of all wavelengths in the optical transmission spectrum may be re-assigned to different groups, either dynamically or upon halting operation of the switch 200. It should also be appreciated that the complete absence of the WDD devices $230_{1,2,\ldots,M}$ would not impact the functionality of the present invention, as it would be possible to feed the incoming single-wavelength optical signals directly into the wavelength-group photonic switching modules $250_{1,2,\ldots,G}$ (e.g., from an array of DWDM transponder sources).

It should further be appreciated that the photonic switch 200 is modular on a per line card basis (single fiber in or out carrying multiplexed DWDM traffic) and on a per wavelength group basis (for the photonic switch core 210).

Figure 3A:
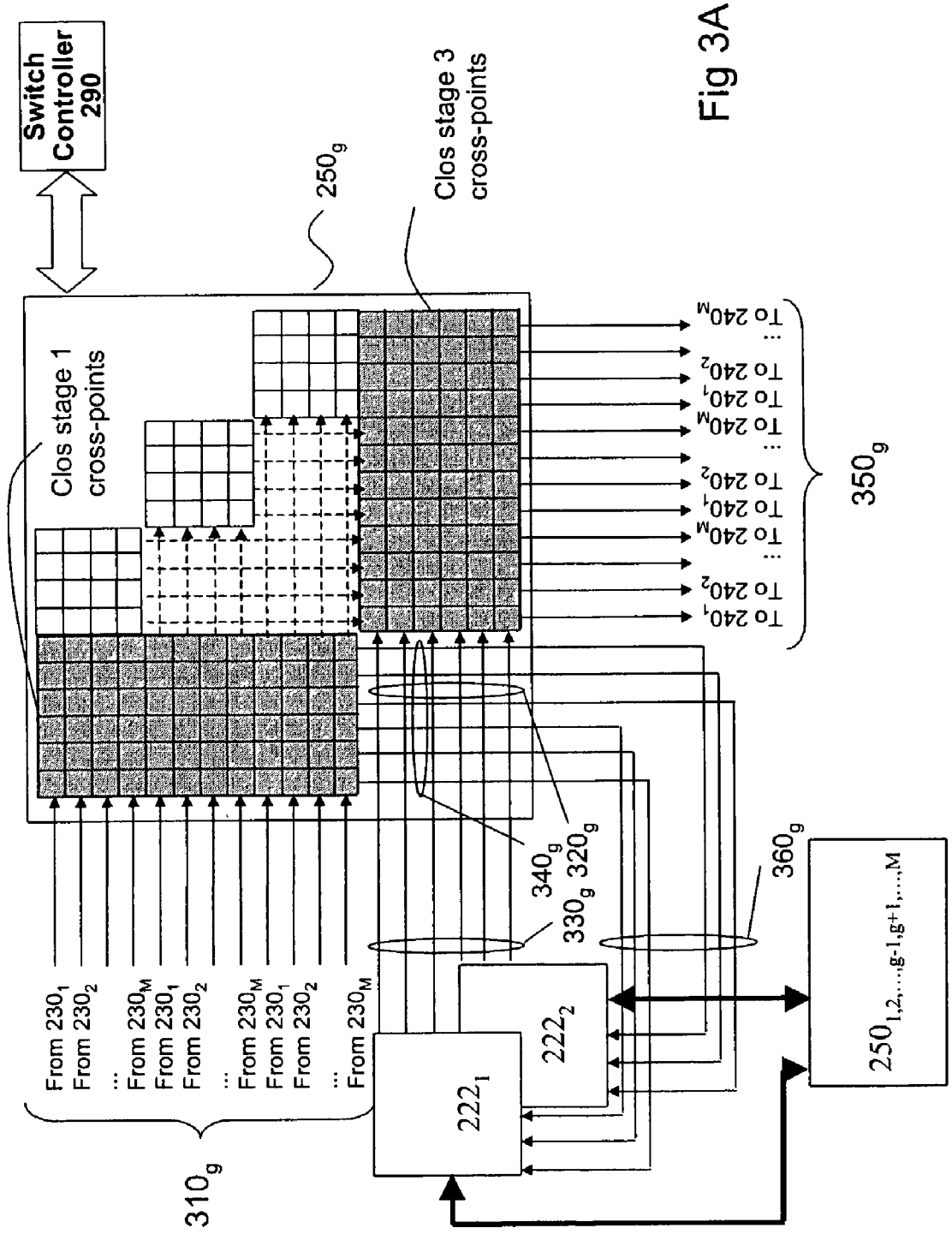
FIG. 3A illustrates a wavelength-group photonic switching module used in the optical switch of FIG. 2.

With additional reference to FIG. 3A, each wavelength-group photonic switching module $250_g$ includes a first set of input ports $310_g$ for receiving at least two incoming single-wavelength signals on each of at least two wavelengths in the associated group, i.e., group "g". The input ports $310_g$ may be termed "external" input ports, as they carry incoming single-wavelength optical signals received from outside the optical switch 200, in this case via WDM devices $230_{1-M}$. In addition, the wavelength-group photonic switching module $250_g$ further includes a second set of input ports $320_g$ that do not carry signals received from outside the optical switch. Rather, the single-wavelength optical signals received at the second set of input ports $320_g$ are supplied by a respective set of output ports $330_g$ of the wavelength conversion module 220. As such, the input ports $320_g$ may be termed "internal" input ports. In practice, the internal and external ports are identical to one another, with the partitioning of "internal" or "external" being effected according to how they are used, which is determined by whether they are connected to WDM devices, WDD devices or to the wavelength conversion module 220.

One difference between the internal input ports $320_g$ and the external input ports $310_g$ is in the wavelength occupied by the optical signal expected to arrive via each of these ports. Specifically, each of the external input ports $310_g$ will generally carry light only of a fixed wavelength associated with the port of the WDD device that it is connected to (one of N/G different values, in this case constrained to belonging to group "g"), while the signal arriving via one of the internal input ports $320_g$ will have undergone wavelength conversion and may occupy any of the wavelengths in group "g" at any given time. As will be described herein below, this characteristic allows the design of the wavelength-group switching module $250_g$ to be simplified, to be made more modular and to provide better blocking characteristics than is the case for the basic single-wavelength-plane switch.

Each wavelength-group photonic switching module $250_g$ further has a plurality of output ports, including internal output ports $340_g$ and external output ports $350_g$. The external output ports $350_g$ of the $g^{th}$ photonic switching module $250_g$ carry switched single-wavelength optical signals occupying pre-determined wavelengths (within group "g") for onward transmission outside of the optical switch 200, optionally via the WDM devices $240_{1,2,\ldots,M}$. As for the internal output ports $340_g$ of each wavelength-group photonic switching module $250_g$, these carry switched single-wavelength optical signal towards a respective set of input ports $360_g$ of the wavelength conversion module 220. It is noted that any given one of the internal output ports $340_g$ of a particular wavelength-group photonic switching module $250_g$ may, at any given time, be used by any one of the wavelengths belonging to group "g".

Each of the WDM devices $240_{1,2,\ldots,M}$, if used, combines light from a subset of the totality of external output ports $350_{1,2,\ldots,G}$ on each of the wavelength-group photonic switching modules $250_{1,2,\ldots,G}$. More specifically, each of the WDM devices $240_{1,2,\ldots,M}$ combines light from a subset of the external output ports which carries switched single-wavelength optical signals occupying distinct wavelengths. The output of each of the WDM devices $240_{1,2,\ldots,M}$ is an outgoing multi-wavelength optical signal, which is routed to other parts of the optical transport network. Of course, it is within the scope of the present invention for the switched single-wavelength optical signals received via the external output ports $350_g$ of the wavelength-group optical switching units $250_{1,2,\ldots,G}$ to lead directly out of the optical switch 200 without undergoing optical multiplexing.

For the purposes of this description, it will be assumed that the aggregate number of external input ports $310_{1,2,\ldots,G}$ is evenly distributed amongst all the wavelength-group photonic switching modules $250_{1,2,\ldots,G}$. Moreover, it will be assumed that the number of external output ports $350_g$ on each wavelength-group photonic switching module $250_g$ is equal to the number of external input ports $310_g$ on that module. Thus, each of the wavelength-group photonic switching modules $250_{1,2,\ldots,G}$ has ((M×N)/G) external input ports $310_g$ and ((M×N)/G) external output ports $350_g$. However, it should be understood that the totality of the external input ports $310_{1,2,\ldots,G}$ need not be evenly distributed amongst the wavelength-group photonic switching modules $250_{1,2,\ldots,M}$ and that the number of external output ports $350_g$ on a particular wavelength-group photonic switching module $250_g$ need not equal the number of external input ports $310_g$ on that module. In fact, in the case where dark lambda concentration is being effected at an edge photonic switch node, there may be more inputs than outputs in the access-to-core direction and more outputs than inputs in the core-to-access direction.

It should be apparent that the relative amount of switching resources devoted to wavelength-converted signals is a parameter of interest when evaluating the performance of the optical switch 200. This can be quantified by a ratio that defines the number of external input ports $310_g$ per internal input port $320_g$ for a given wavelength-group photonic switching module $250_g$. In other words, if $R_g$ represents this ratio, referred to as a wavelength conversion resource factor, then there will be $R_g$ times as many external input ports $310_g$ than internal input ports $320_g$ for wavelength-group optical switching unit $250_g$. Of course, if each of the wavelength-group photonic switching modules $250_{1,2,\ldots,G}$ has the same number of internal and external input ports, then clearly there will be $R_g$ (=R) times as many external input ports $310_{1,2,\ldots,G}$, in total, than there will be total internal input ports $320_{1,2,\ldots,G}$. Moreover, the fact that there is one output port per input port means that there will also be R times as many external output ports $350_g$ as there are internal output ports $340_g$ for each wavelength-group photonic switching module $250_g$.

Thus, each wavelength-group photonic switching module $250_g$ in the example of FIG. 2 has (M×N/G) external input ports $310_g$, (M×N/(G×R)) internal input ports $320_g$, (M×N/G) external output ports $350_g$ and (M×N/(G×R)) internal output ports $340_g$. This gives a total port count of (M×N/G)×(1+1/R) input ports and as many output ports per wavelength-group photonic switching module. It should further be appreciated that R, the wavelength conversion resource factor, may be less than unity. In other words, there may be fewer external input (or output) ports than internal input (or output) ports on any or all of the wavelength-group photonic switching modules $250_{1,2,\ldots,G}$. However, normally R will be greater than unity with, as an example, 33% wavelength conversion creating a value of R=3.

FIG. 3A provides further detail regarding the internal structure of an example wavelength-group photonic switching module $250_g$ suitable for use within the photonic switch core 210 of the present invention. In one embodiment, the wavelength-group photonic switching module $250_g$ is equipped with the capability to switch any of its input ports to any of its output ports. Specifically, implementation of the wavelength-group switching module $250_g$ may be by way of providing one large ((M×N/G)×(1+1/R))-square cross-point optical switch. This allows each of the external input ports $310_g$ and each of the internal input ports $320_g$ to be switched to any of the external output ports $350_g$ or any of the internal output ports $340_g$.

However, in many practical applications, the full ((M×N/G)×(1+1/R))-square switching capability of the wavelength-group photonic switching module $250_g$ is not required and hence the design of the module can be simplified.

Specifically, recall that each of the external input ports $310_g$ carries an incoming single-wavelength optical signal occupying a pre-determined wavelength of light. In some cases, it will be necessary to convert this wavelength (CASE I) and in other cases, in will not be necessary to convert this wavelength (CASE II).

CASE I

The incoming single-wavelength optical signal arriving at the wavelength-group switching module $250_g$ via one of its external input ports $310_g$ is redirected towards one of the internal output ports $340_g$ connected to the input ports $360_g$ of the wavelength conversion module 220. Individual ones of the internal output ports $340_g$ are not associated with any particular wavelength and are capable of receiving any of the incoming single-wavelength optical signals.

CASE II

The incoming single-wavelength optical signal arriving at the wavelength-group switching module $250_g$ via one of its external input ports $310_g$ can directly exit the optical switch 200 via one of the WDM devices $240_{1,2,\ldots,M}$. However, only a limited number of input ports of each WDM device $240_m$ ($1 \leq m \leq M$) are associated with the exact wavelength of the signal in question. Thus, when switching from the external input ports $310_g$ to the external output ports $350_g$, the wavelength-group photonic switching module $250_g$ only need to provide the capability of switching each of the external input ports $310_g$ to the limited subset of the external output ports $350_g$ associated with the same wavelength of light.

In view of the above, it is desirable for each wavelength-group photonic switching module $250_g$ to be configured so as to allow any of its external input ports $310_g$ to be switched to any of its internal output ports $340_g$, while the switching of those external input ports $310_g$ associated with a given wavelength can be limited to only those external output ports $350_g$ that are associated with the same wavelength. Moreover, because a signal output by the wavelength conversion module 220 may occupy any wavelength within group "g", the wavelength-group photonic switching module $250_g$ will need to be able to switch any of its internal input ports $320_g$ to any one of its external output ports $350_g$. However, since there is typically no reason for a signal output by the wavelength conversion module 220 to re-enter the latter, the wavelength-group photonic switching module $250_g$ need not be equipped with the ability to switch its internal input ports $320_g$ to its internal output ports $340_g$.

Figure 3B:
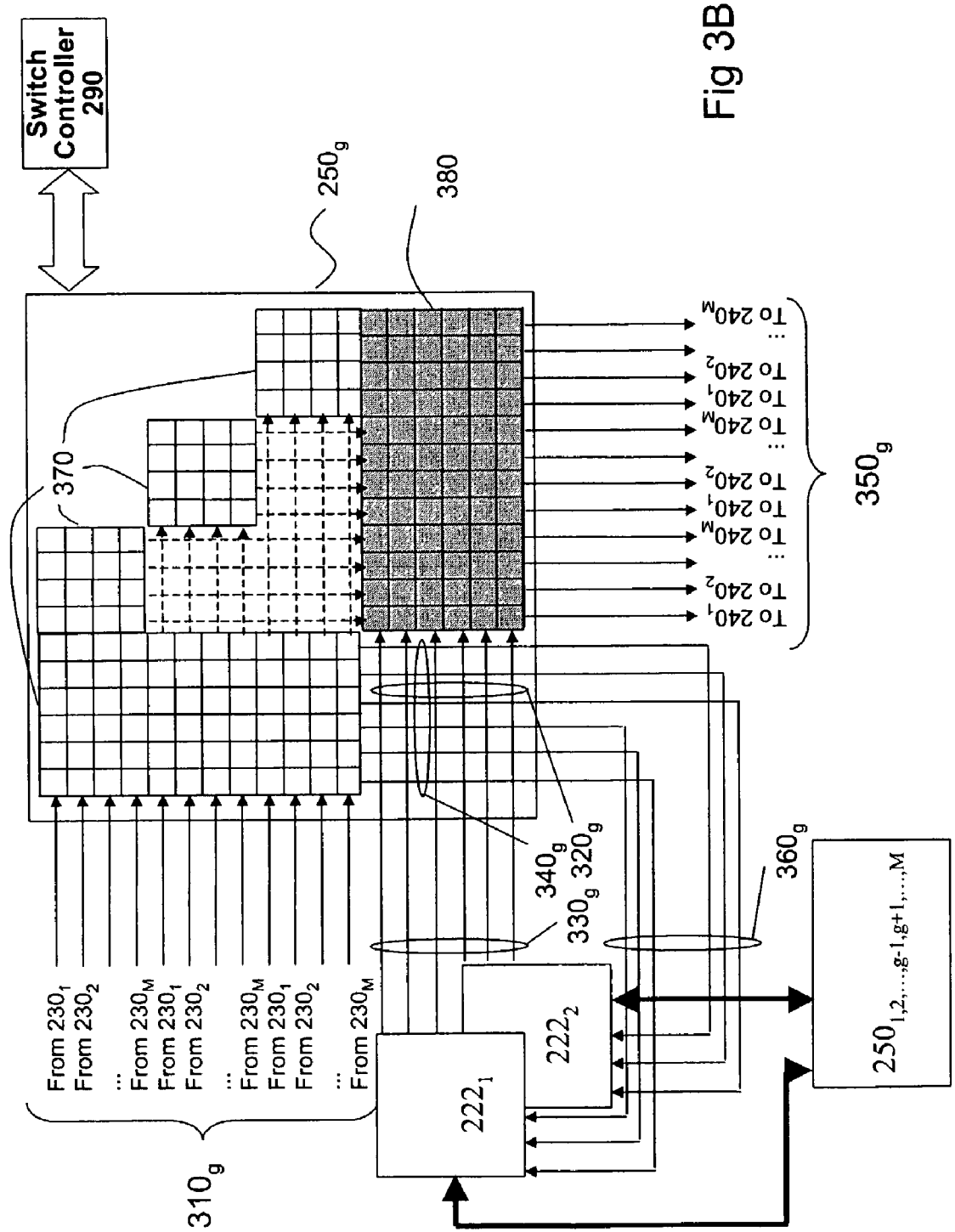
FIG. 3B illustrates the concept of a three-stage switching structure existing within the optical switch of FIG. 2.

Accordingly, FIG. 3B shows that the desired switching functionality can be achieved by providing a first set of switch cross-points 370 that are dedicated to switching the external input ports $310_g$ of the wavelength-group photonic switching module $250_g$ and a second set of cross-points 380 that are dedicated to switching the internal input ports $320_g$ of that module. The cross-points 370, 380 may be implemented by placing, at each cross-point, a mechanically controlled micro-mirror, such as a micro-electro-mechanical switch (MEMS). Control instructions regarding the desired state (raised or lowered) of a particular mirror are provided by a switch controller 290, which maintains a connection map. The switch controller 290 may either be a part of, or external to but in communication with, the photonic switch core 210. In some embodiments, the switch controller 290 may be embedded as a microprocessor on a control card.

For its part, the wavelength conversion module 220 represents the second stage of a CLOS switching architecture. In particular, it is noted that the wavelength conversion module 220 may be broken down into multiple parallel centre stage switches of size (K×G)×(K×G), K being an integer above 0. In the illustrated example, the centre stage switches are denoted $222_1$, $222_2$ and the total number of centre stage switches is equal to two. This means that for a total of (M×N/(G×R)) input ports of the wavelength conversion unit are divided amongst both centre stage switches $222_1$, $222_2$, which means that in this example, K=(M×N)/(R×2). In general, where Y denotes the total number of centre stage switches in the second stage of the CLOS switching architecture, the dimensions of each switch will be (M×N×G)/(R×Y) by (M×N×G)/(R×Y).

Thus, the number of CLOS centre stage switches can be made a function of the level of lambda conversion required and thus for low levels of lambda conversion, the number of CLOS centre stages is reduced and the virtual CLOS first and third stages will automatically reduce in size, as ports are diverted back into being external, not internal ports. Thus, there is modularity due to better scaling for the CLOS architecture. Advantageously, given the architecture of the optical switch 200, additional wavelength conversion resources can be provided on an as-needed basis.

For its part, the wavelength conversion module 220 includes the G sets of input ports $360_{1,2,\ldots,G}$ and the G sets of output ports $330_{1,2,\ldots,G}$. Each of the input ports in the set of input ports $360_g$ carries a single-wavelength optical signal occupying any wavelength in group "g" as provided by the $g^{th}$ wavelength-group photonic switching module $250_g$. Each received signal in group "g" is converted into one of the wavelengths belonging to, say, group "h". The converted signal is provided on the appropriate one of the output ports $340_h$, which leads to a respective one of the internal input ports $320_h$ of the wavelength-group photonic switching module $250_h$. For each received signal in group "g", the switch controller 290, which maintains the connection map for the photonic switch core 210 and the wavelength conversion module 220, provides the identity of the wavelength group "h", as well as the precise wavelength to which the received signal is being converted and the output port to which it is being sent.

Those skilled in the art will observe that incoming single-wavelength optical signals not requiring wavelength conversion will be switched once by the cross-points 370, while incoming single-wavelength optical signals requiring wavelength conversion will be switched once by the cross-points 370, once by the wavelength conversion module 220 and once by the cross-points 380. With reference now to FIG. 3A, a conceptual view of the switch as providing three-stage CLOS switching functionality for wavelength-converted signals is presented. Specifically, it is possible to identify cross-points denoting the first stage of switching as well as cross-points denoting the third stage of switching. Thus, the fist and third stages are embedded within the wavelength-group photonic switching modules $250_{1,2,\ldots,G}$. The second stage of switching occurs in the wavelength conversion module 220.

Greater detail regarding possible configurations for the wavelength conversion module are provided in FIGS. 4A through 4E. It will be appreciated that each of the options 4A through 4E can be used as one of several parallel CLOS center stage switches or, by making the switches much larger, can provide a single switching operation. However, the use of these designs as CLOS center stages permits scalability and the use of smaller converter second stage switches, which is more compatible with existing photonic technology.

Figure 4A:
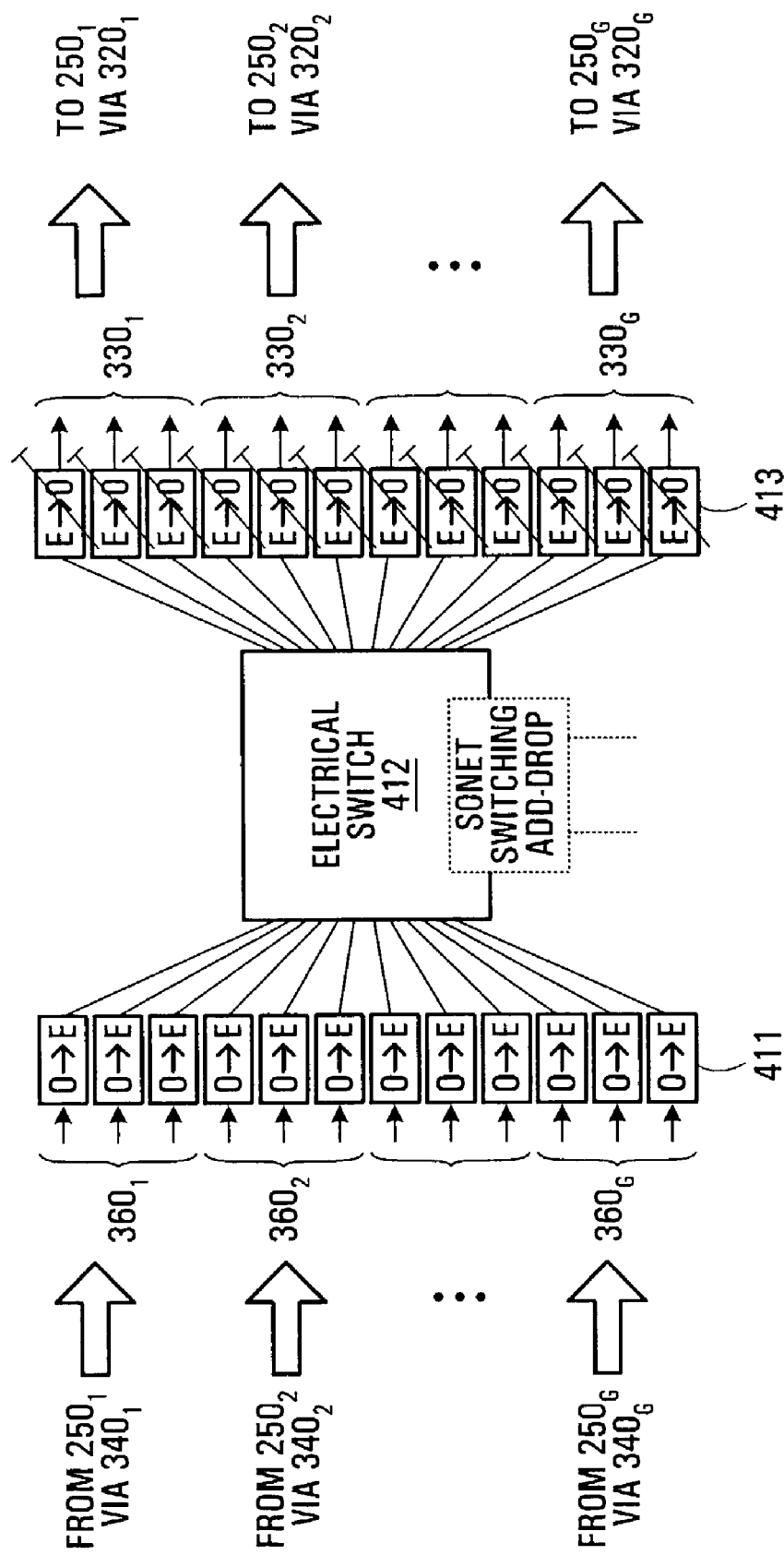
FIGS. 4A–4E show various embodiments of the wavelength conversion module of FIG. 2.

Specifically, with reference to FIG. 4A, there is shown a wavelength conversion module 410 with a bank of opto-electronic converters 411, one converter for each of the inputs $360_{1,2,\ldots,G}$ to the wavelength conversion module 410. Each of the opto-electronic converters 411 converts light to an electrical signal. The outputs of the opto-electronic converters 411 are connected to inputs of an electrical switch 412, for providing switching such as SONET, ATM, IP or Ethernet switching, for example. The outputs of the electrical switch 412 are connected to inputs of electro-optical converters 413. Each of the electro-optical converters 413 converts an electrical signal to light of a particular wavelength. The outputs of the electro-optical converters 413 represent the complete set of outputs $330_{1,2,\ldots,G}$ of the wavelength conversion module 410.

Figure 4B:
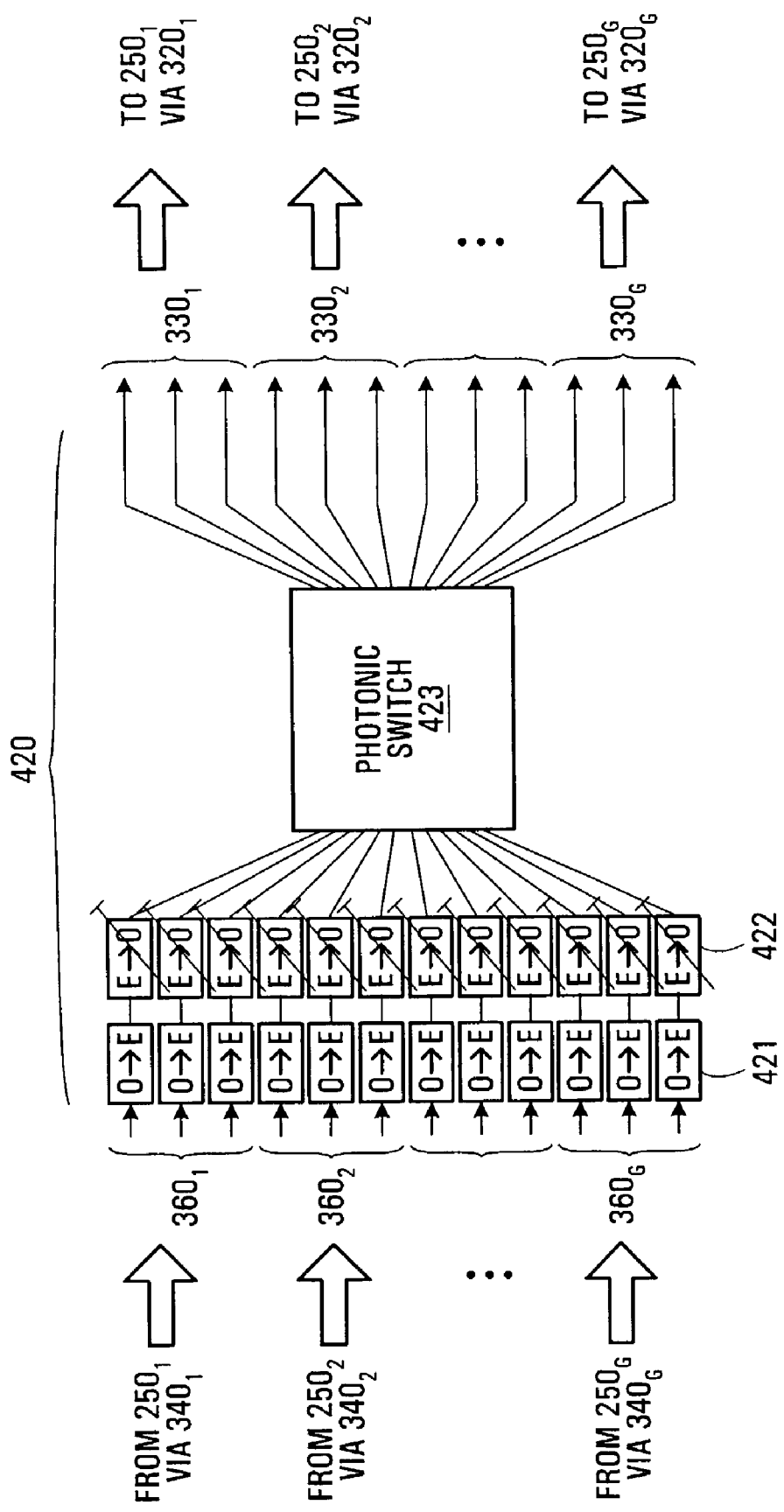

Another embodiment is presented in FIG. 4B, wherein is shown a wavelength conversion module 420 with a bank of opto-electronic converters 421, one converter for each of the inputs $360_{1,2,\ldots,G}$ to the wavelength conversion module 420. Each of the opto-electronic converters 421 converts light to an electrical signal. The outputs of the opto-electronic converters 421 are connected to inputs of a corresponding bank of electro-optical converters 422. Each of the electro-optical converters 422 converts an electrical signal to light of a particular wavelength. The outputs of the electro-optical converters 422 are fed to a photonic switch 423, for providing purely photonic switching. The outputs of the photonic switch 423 represent the complete set of outputs 330$_{1,2,\ldots,G}$ of the wavelength conversion module 420.

Figure 4C:
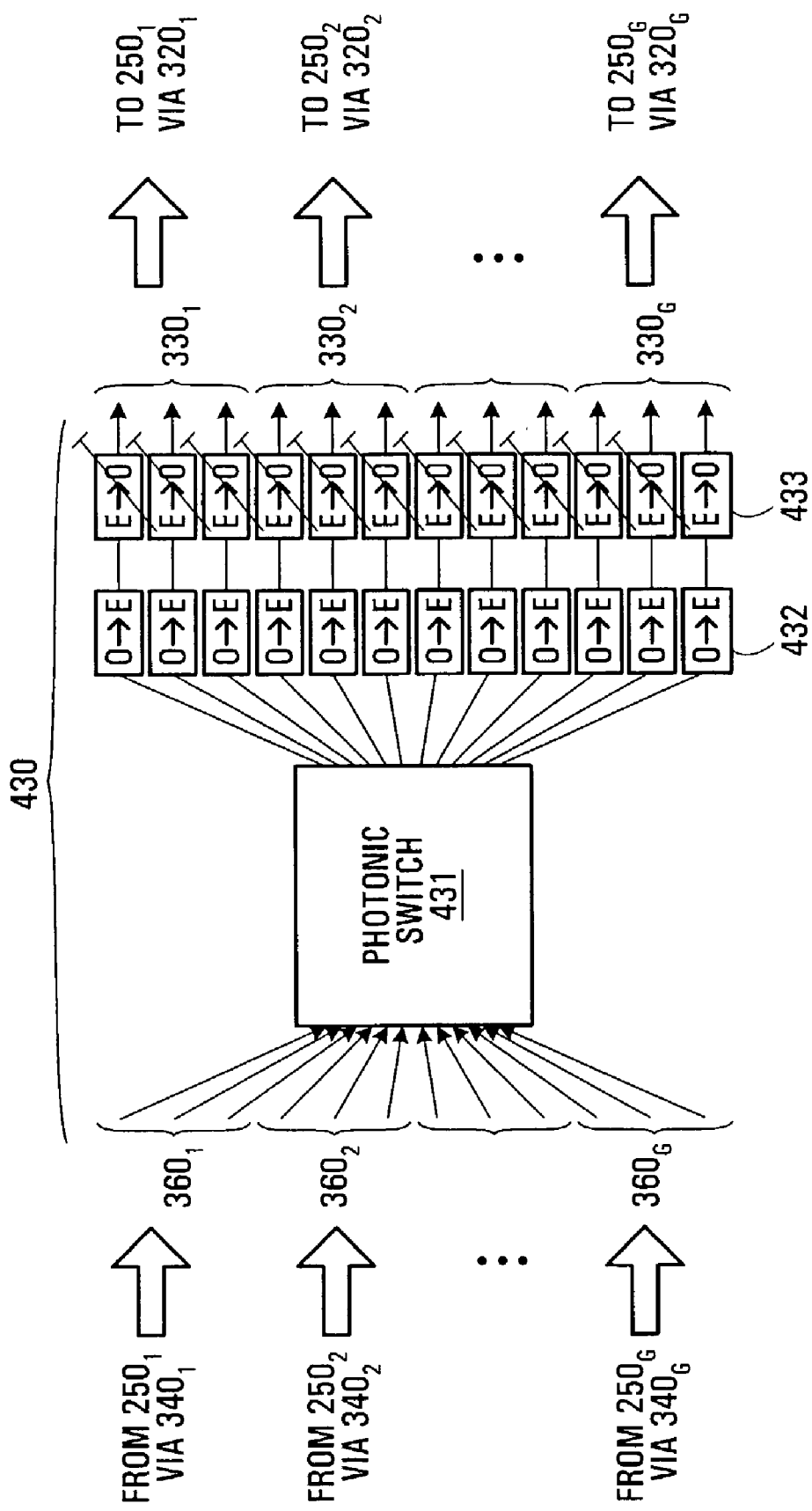

Yet another embodiment is presented in FIG. 4C, wherein is shown a wavelength conversion module 430 with a photonic switch 431, for providing purely photonic switching. The photonic switch 431 has one input for each of the inputs 360$_{1,2,\ldots,G}$ to the wavelength conversion module 430. The outputs of the photonic switch 431 are provided to a bank of opto-electronic converters 432. Each of the opto-electronic converters 432 converts light to an electrical signal. The outputs of the opto-electronic converters 432 are connected to inputs of a corresponding bank of electro-optical converters 433. Each of the electro-optical converters 433 converts an electrical signal back to light of a specified wavelength. The outputs of the electro-optical converters 433 represent the complete set of outputs 330$_{1,2,\ldots,G}$ of the wavelength conversion module 430.

The above-described embodiments of the wavelength conversion module 410, 420 and 430 provide dedicated electro-optical and opto-electronic conversion resources for each signal arriving at the wavelength conversion module or each signal leaving the wavelength conversion module. This has the effect of guaranteeing that a signal that can be switched by the underlying photonic or electrical switch will emerge at the appropriate wavelength. At the same time, however, this results in a wastage of resources when the level of wavelength conversion is expected to be relatively small. In order to permit scalability from very low levels of wavelength conversion to wavelength conversion for all inputs, the embodiments of FIGS. 4D and 4E may be used.

Figure 4D:
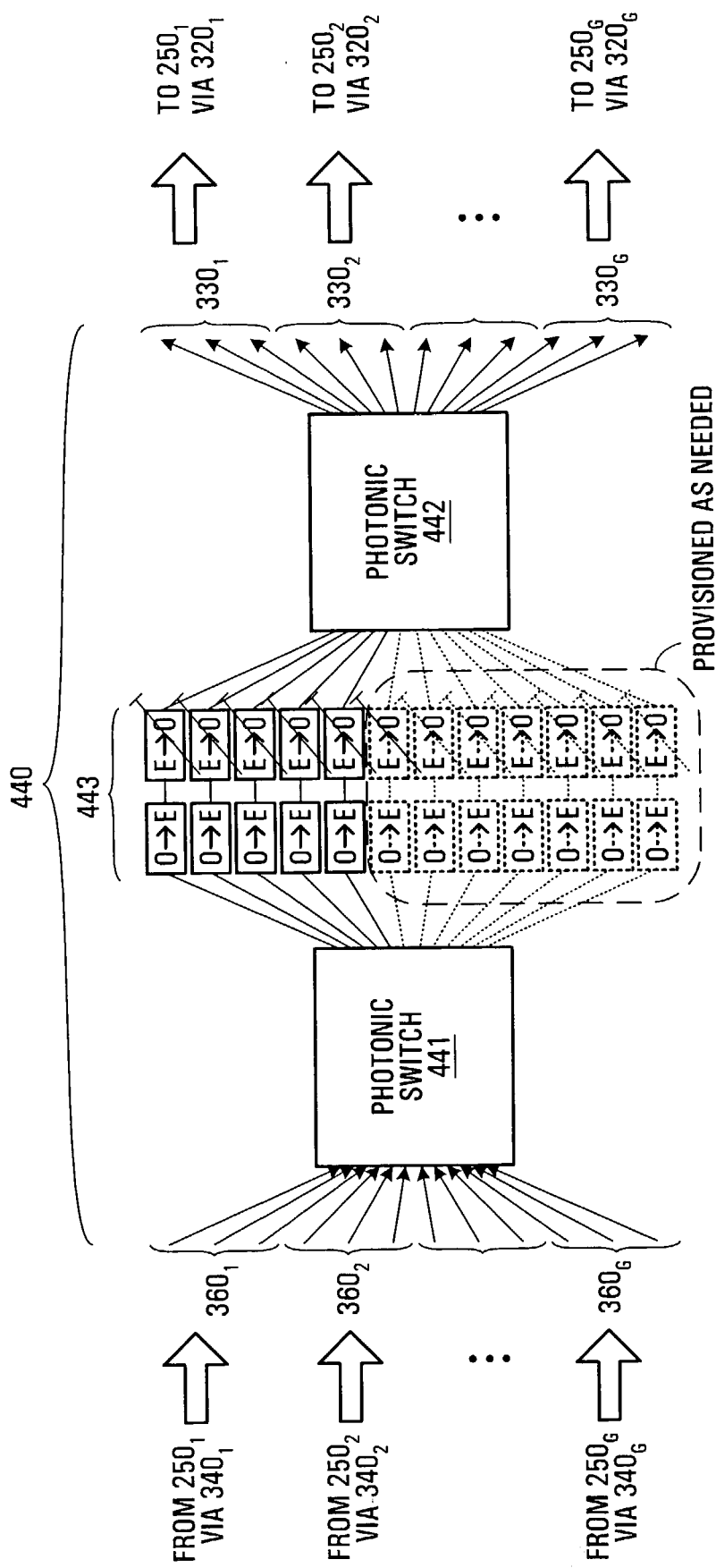

Specifically, FIG. 4D shows a wavelength conversion module 440 in which dual photonic switches 441 and 442 are used. The inputs of photonic switch 441 correspond to the inputs 360$_{1,2,\ldots,G}$ of the wavelength conversion module 440 and the outputs of photonic switch 442 correspond to the outputs 330$_{1,2,\ldots,G}$ of the wavelength conversion module 440. In between the two photonic switches, there is provided a bank of tandem opto-electronic/electro-optical conversion units 443 that grows in accordance with the switching requirements of the wavelength conversion unit 440.

Figure 4E:
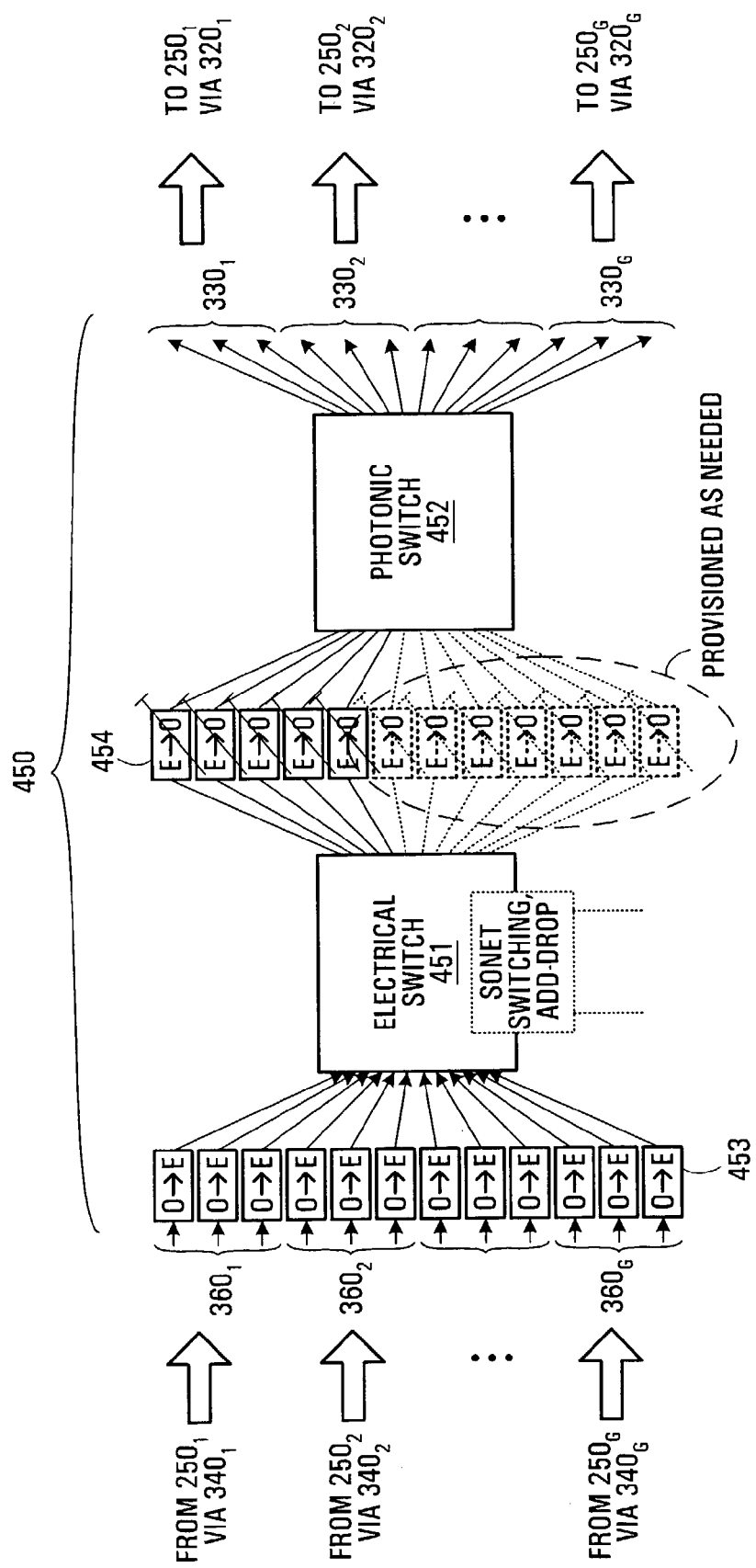

In a similar fashion, FIG. 4E shows a wavelength conversion module 450 in which there is provided a series combination of an electrical switch 451 and a photonic switch 452. The electrical switch 451 is preceded by a full bank of opto-electrical converters 453 connected to the inputs 360$_{1,2,\ldots,G}$ of the wavelength conversion module 450, while a subset of the outputs of the electrical switch 451 are connected to a corresponding subset of the inputs of the photonic switch 452 via a provisioned-as-needed bank of electro-optical converters 454. Clearly, as the wavelength conversion requirements grow, a greater number of electro-optical converters 454 may be added.

In each of the embodiments 4A through 4E, it should be understood that the wavelength conversion unit 220 actually consists of parallel "slices", each slice consisting of an individual module as described above and illustrated at 410, 420, 430, 440 and 450. Of course, in such instances, the inputs and outputs of the wavelength conversion module would be distributed amongst the individual slices.

In operation, it is of interest to evaluate the blocking performance of the optical switch 200. Those skilled in the art will appreciate that the load of the optical switch 200 is a parameter of interest when evaluating the performance of the optical switch 200. Specifically, the load of the switch 200 at a given time may be defined as the percentage of the total number of external input ports 310$_{1,2,\ldots,G}$ on the set of G wavelength-group photonic switching modules 250$_{1,2,\ldots,G}$ that carry an incoming single-wavelength optical signal at the given time. The load of the optical switch 200, expressed as a percentage, will thus range from 0 (representing no load) to 100 (representing full load).

As has been previously mentioned with reference to FIG. 3A, the optical switch 200 functions as a single-stage switch for incoming single-wavelength optical signals not requiring wavelength conversion and as a three-stage CLOS switch for input signals that do require wavelength conversion. Due to the fact that each wavelength-group photonic switching module 250$_g$ in the optical switch 200 handles N/G times as many wavelengths as in a single-wavelength-plane switch, the blocking performance of the optical switch 200 for most traffic mixes, and particularly under conditions of heavy load, is considerably improved with respect to its single-wavelength-plane counterpart. At the same time, the optical switch 200 is not nearly as complex or mechanically fragile as a three-dimensional fully non-blocking architecture. A computer-based simulation was used to confirm the superior blocking performance of the optical switch 200 relative to its conventional single-wavelength-plane counterpart. This is now described with reference to FIGS. 5A through 5C.

Figure 5A:
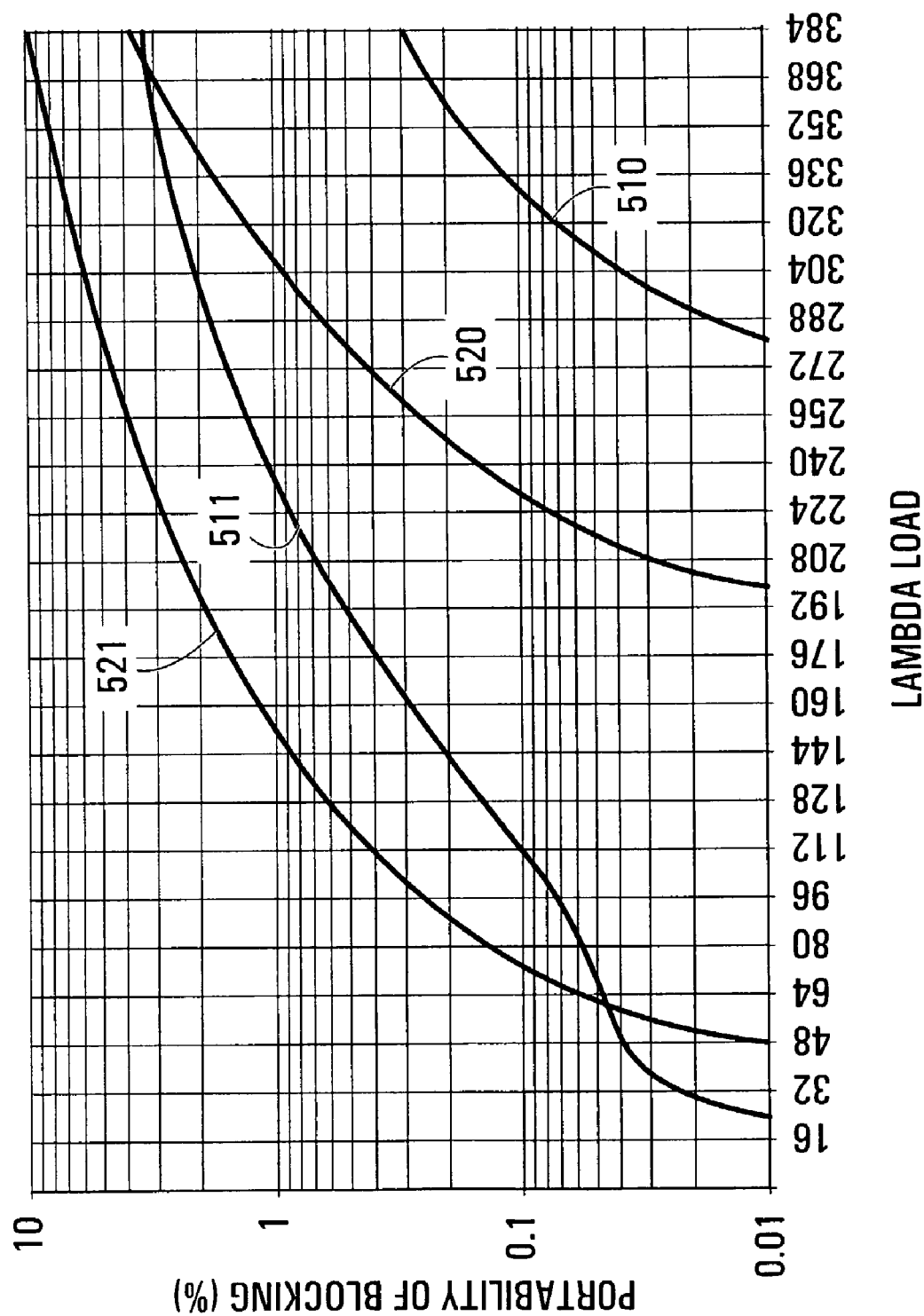
FIGS. 5A–5C are graphs illustrating the performance of the optical switch of FIG. 2, as modeled using computer simulations.
Figure 5B:
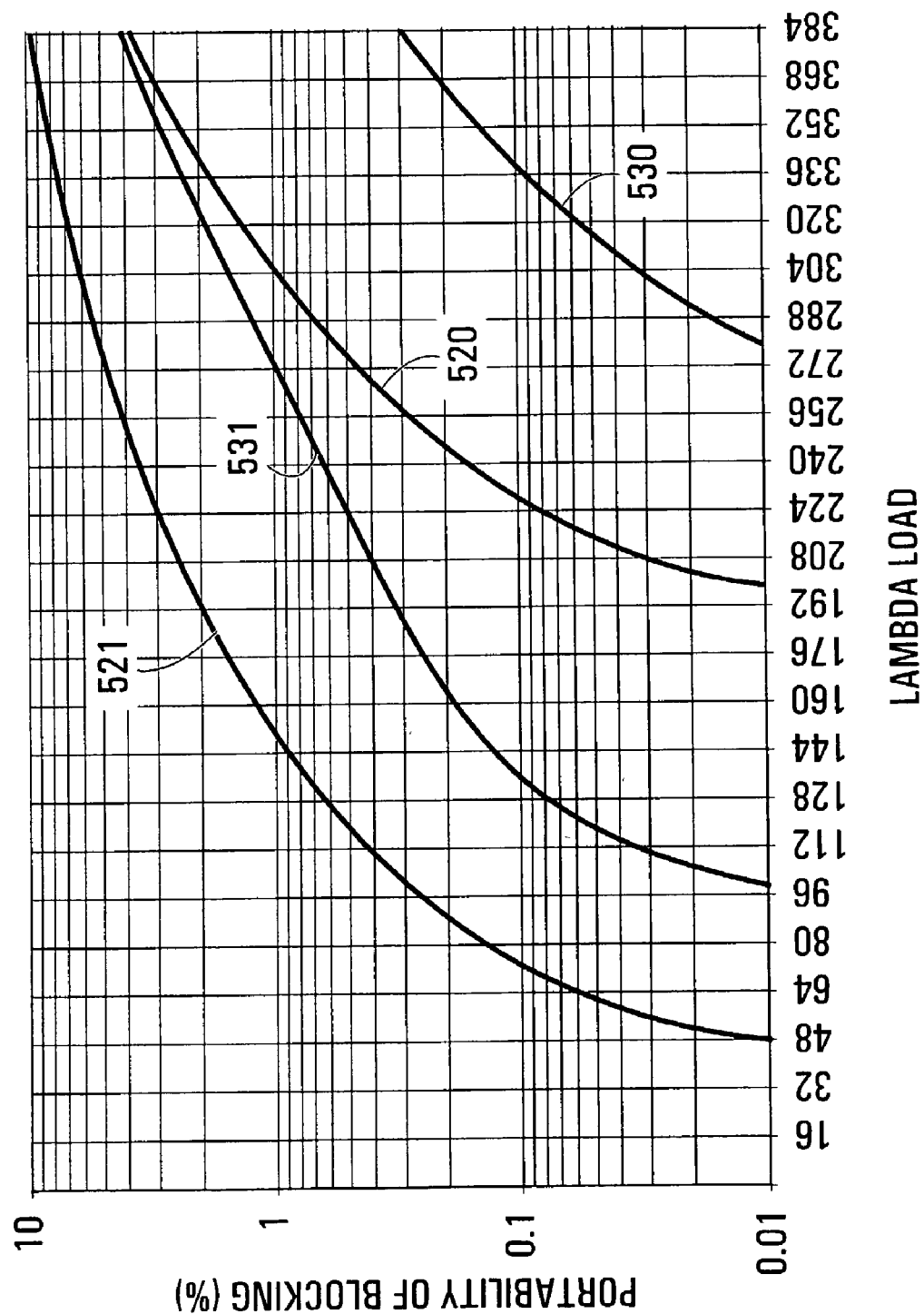
Figure 5C:
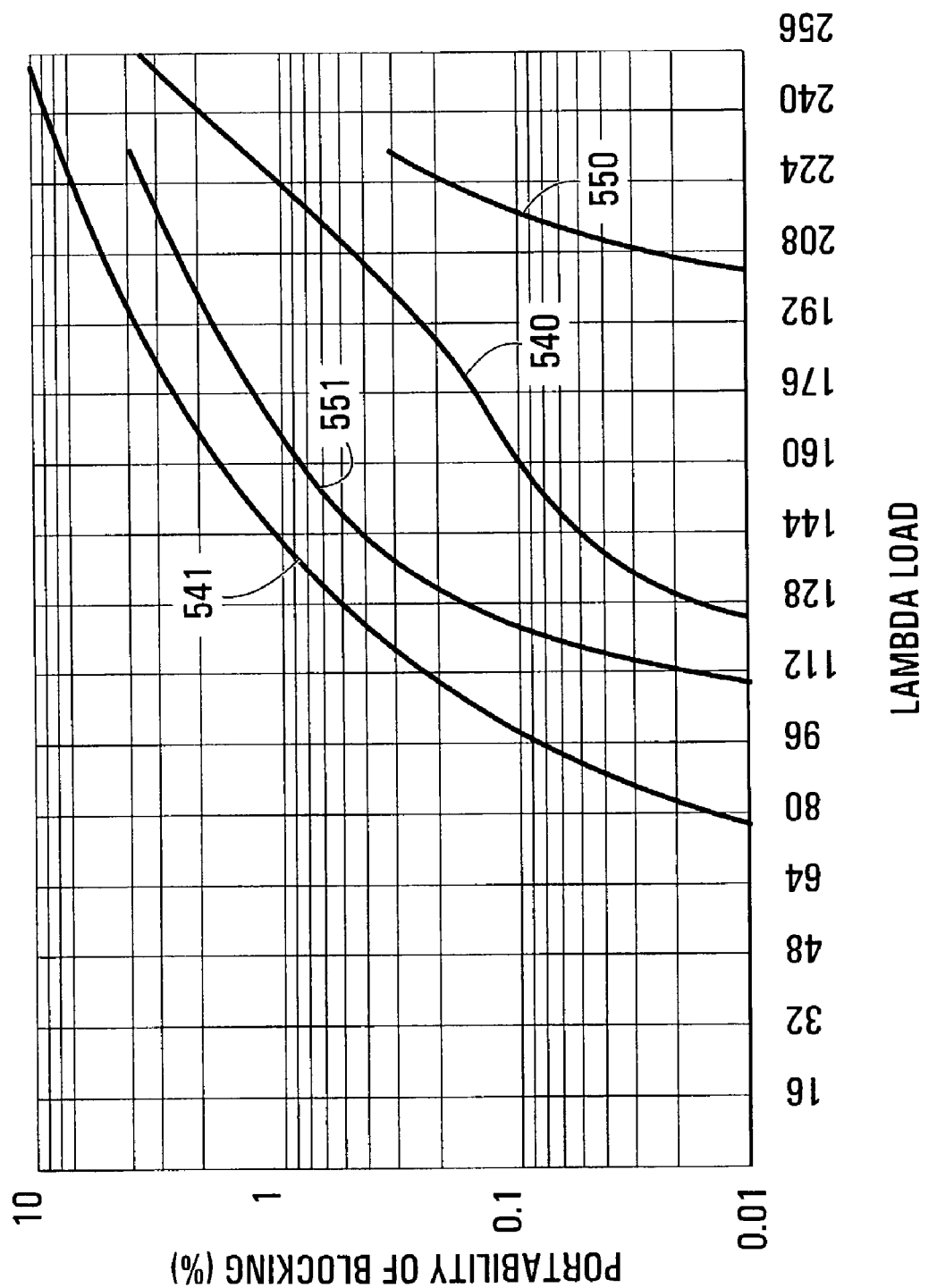

Specifically, FIGS. 5A through 5C show various curves of the blocking probability versus the total number of external input ports 310$_{1,2,\ldots,G}$ that carry an optical signal. The blocking probability, denoted "$P_{block}$", is defined as the probability that an incoming single-wavelength optical signal (received by the photonic switch core 210 along one of the external input ports 310$_{1,2,\ldots,G}$ of the wavelength-group photonic switch modules 250$_{1,2,\ldots,G}$) will not exit the optical switch 200 at the desired wavelength. The blocking probability $P_{block}$ is a benchmark by which the performance of the switch 200 may be evaluated. While the criteria used to evaluate whether a blocking probability is considered desirable or acceptable depend on the network design and carrier requirements, it is generally the case that a blocking probability of 0.1% (or more) at a load of 60% (or less) would be considered inadequate and a blocking probability of 0.1% (or less) at a load of 85% (or more) would be considered adequate, dependent upon the actual network application. Note that, once a switch node reaches a utilization level of about 85%, the sheer unpredictability of traffic forecasting demands that the node be reinforced by increasing switching capacity, so a graceful further increase in blocking beyond 0.1% at greater than 85% load is generally not overly problematic.

It should be apparent that an incoming single-wavelength optical signal not requiring wavelength conversion will be blocked when all the like-wavelength external output ports of the corresponding photonic switching module are already occupied. In addition, an incoming single-wavelength optical signal occupying a wavelength $\lambda_1$ in group "g" and requiring wavelength conversion to a wavelength $\lambda_2$ in group "h" will be blocked when either (1) all the internal output ports 340$_g$ of photonic switching module 250$_g$ are already occupied or (2) all the external output ports 350$_h$ of photonic switching module 250$_h$, which are associated with wavelength $\lambda_2$, are occupied.

The various simulations in FIGS. 5A through 5C relate the blocking performance of the optical switch 200 for different values of the wavelength conversion resource factor (described previously and denoted R) and the requirement for wavelength conversion (denoted B). Regarding the wavelength conversion requirement "B", it can be assumed that the incoming single-wavelength optical signals have a probability "B" of requiring wavelength conversion, where B % wavelength conversion requirement in the traffic mix signifies that one out of every 100/B incoming single-wavelength optical signals will require wavelength conversion by the optical switch 200.

For the purposes of the simulation in FIGS. 5A through 5C, the aggregate number of input ports (i.e., internal input ports $320_{1,2,\ldots,G}$ and external input ports $310_{1,2,\ldots,G}$) for the photonic switch core 210 is equal to 512. Thus, the sum of (M×N) external input ports and ((M×N)/R)) internal input ports equals 512. Hence, for different values of R, the number of external and internal input ports will vary, although the sum total will remain constant. In the case where the sum total equals to 512, the total number of available external input ports is equal to (512*R/(1+R)) It should be noted that when R is equal to unity, this means that there are as many external input ports to the wavelength-group photonic switch modules as there are internal input ports. When R is greater than one, then there are more external input ports than internal input ports and when R is less than one, then the balance is in favour of the internal input ports. It should be noted that it is intrinsic to the nature of CLOS switches that some over-provisioning of lambda conversion capacity is required for optimal dynamic blocking characteristics. This over-provisioning allows R to drop below unity.

The blocking behavior of the switch was tracked as the switch was increasingly loaded with random traffic over the full range from 0–100%, twenty times in each configuration and then the results were averaged and fitted to a curve (see curves 510, 520, 530, 540 and 550). These results have been contrasted with those for a single-wavelength plane switch (see curves 511, 521, 531, 541 and 551) under the same conditions of the wavelength conversion resource factor ("R") and the requirement for wavelength conversion ("B").

load, for the case where there is a 25% wavelength conversion requirement. Meanwhile, a blocking probability of 1% is reached at 81% load and a blocking probability of 0.1% is reached at 60% load, for the case where there is a 33% wavelength conversion requirement. Thus, FIG. 5B shows that a combination of controlled over-provisioning and wavelength-group switching allows highly desirable blocking performance to be achieved.

This compares favourably to the single-wavelength plane switch (curves 511 and 521), in which a blocking probability of 1% is reached at only 57% load and a blocking probability of 0.1% is reached at only 29% load, for the case where there is a 25% wavelength conversion requirement, while a blocking probability of 1% is reached at only 40% load and a blocking probability of 0.1% is reached at only 19% load, for the case where there is a 33% wavelength conversion requirement.

|  | Curve | R | Available external ports | B | # of external ports (and corresponding % load) at which ... | |
|---|---|---|---|---|---|---|
|  |  |  |  |  | $P_{block} = 1\%$ | $P_{block} = 0.1\%$ |
| FIG. 5B | 520 | 3 | 384 | 33% | 310/384 (81%) | 230/384 (60%) |
|  | 521 | 3 | 384 | 33% | 154/384 (40%) | 74/384 (19%) |
|  | 530 | 11/5 | 352 | 33% | Never reached | 342/352 (97%) |
|  | 531 | 11/5 | 352 | 33% | 278/352 (79%) | 138/352 (39%) |

In both of curves 520 and 530, the wavelength conversion requirement (B) is kept constant at 33%, i.e., one out of every three incoming single-wavelength optical signals will require wavelength conversion. Between curves 520 and 530, the wavelength conversion resources have been enhanced, for example by adding a line card. As seen from the above table, a blocking probability of 1% is reached at a switch load of 81% load and a blocking probability of 0.1% is reached at 60% load, for the case where there are three times as many external input ports as internal input ports. Meanwhile, a blocking probability of 1% is never reached (regardless of switch load) and a blocking probability of 0.1% is reached at 97% load, for the case where there are 2.2 times as many external input ports as internal input ports.

|  | Curve | R | Available external ports | B | # of external ports (and corresponding % load) at which ... | |
|---|---|---|---|---|---|---|
|  |  |  |  |  | $P_{block} = 1\%$ | $P_{block} = 0.1\%$ |
| FIG. 5A | 510 | 3 | 384 | 25% | Never reached | 330/384 (86%) |
|  | 511 | 3 | 384 | 25% | 218/384 (57%) | 112/384 (29%) |
|  | 520 | 3 | 384 | 33% | 310/384 (81%) | 230/384 (60%) |
|  | 521 | 3 | 384 | 33% | 154/384 (40%) | 74/384 (19%) |

In both of curves 510 and 520, R=3, i.e., the photonic switch core has 3 times as many available external input ports as there are internal input ports. Between curves 510 and 520, the wavelength conversion requirement (B) has been increased. As seen from the above table, a blocking probability of 1% is never reached (i.e., regardless of switch load) and a blocking probability of 0.1% is reached at 86%

This compares favourably to the single-wavelength-plane switch (curves 521 and 531), in which a blocking probability of 1% is reached at a switch load of only 40% load and a blocking probability of 0.1% is reached at only 19% load, for the case where there are three times as many external input ports as internal input ports, while a blocking probability of 1% is reached at only 79% load and a blocking probability of 0.1% is reached at only 39% load, for the case where there are 2.2 times as many external input ports as internal input ports.

|  | Curve | R | Available external ports | B | # of external ports (and corresponding % load) at which . . . | |
|---|---|---|---|---|---|---|
|  |  |  |  |  | $P_{block} = 1\%$ | $P_{block} = 0.1\%$ |
| FIG. 5C | 540 | 1 | 256 | 100% | 226/256 (88%) | 164/256 (64%) |
|  | 541 | 1 | 256 | 100% | 146/256 (57%) | 100/256 (39%) |
|  | 550 | 7/9 | 224 | 100% | Never reached | 218/224 (97%) |
|  | 551 | 7/9 | 224 | 100% | 170/224 (76%) | 122/224 (54%) |

In both of curves 540 and 550, the wavelength conversion requirement (B) is kept constant at 100%, i.e., every incoming single-wavelength optical signal requires conversion of its wavelength. Between curves 520 and 530, the wavelength conversion resources have been enhanced to the point where, in curve 550, the number of internal input ports exceeds the number of external input ports. As seen from the above table, a blocking probability of 1% is reached at a switch load of 88% load and a blocking probability of 0.1% is reached at 64% load, for the case where there are as many external input ports as internal input ports. Meanwhile, a blocking probability of 1% is never reached (reached regardless of switch load) and a blocking probability of 0.1% is reached at 97% load, for the case where there are 0.78 times as many external input ports as internal input ports.

This compares favourably to the single-wavelength-plane switch (curves 541 and 551), in which a blocking probability of 1% is reached at a switch load of only 57% load and a blocking probability of 0.1% is reached at only 39% load, for the case where there are as many external input ports as internal input ports, while a blocking probability of 1% is reached at a load of only 76% and a blocking probability of 0.1% is reached at only 54% load, for the case where there are 0.78 times as many external input ports as internal input ports.

From the above, it is clear that the wavelength-group photonic switch module architecture provides substantially improved performance in comparison to the single-wavelength-plane switch. Specifically, configurations of the optical switch 200 of the present invention exist for which 0.1% blocking probability is achieved even when the load of the switch is as high as 97%, and even when each of the incoming single-wavelength optical signals is required to undergo wavelength conversion. This will clearly satisfy the needs of tandem and core switches in existing and future metropolitan networks. The superior performance is achieved bat least in part because wavelength conversion resources are shared amongst a group of wavelengths, which means that wavelength conversion of a signal at a particular wavelength is possible, as long as there remains one available path to the wavelength converter for that group, and not on an individual per-wavelength basis.

Moreover, the switch remains modular in that additional wavelength-group switching modules can be added as needed to satisfy the requirements of a particular application. This exemplifies the superiority of the design of the optical switch 200 vis-à-vis a three-dimensional fully non-blocking device, which suffers from an inability to scale up or down with an increase or decrease in the number of wavelengths and or optical signals to be switched.

Figure 6:
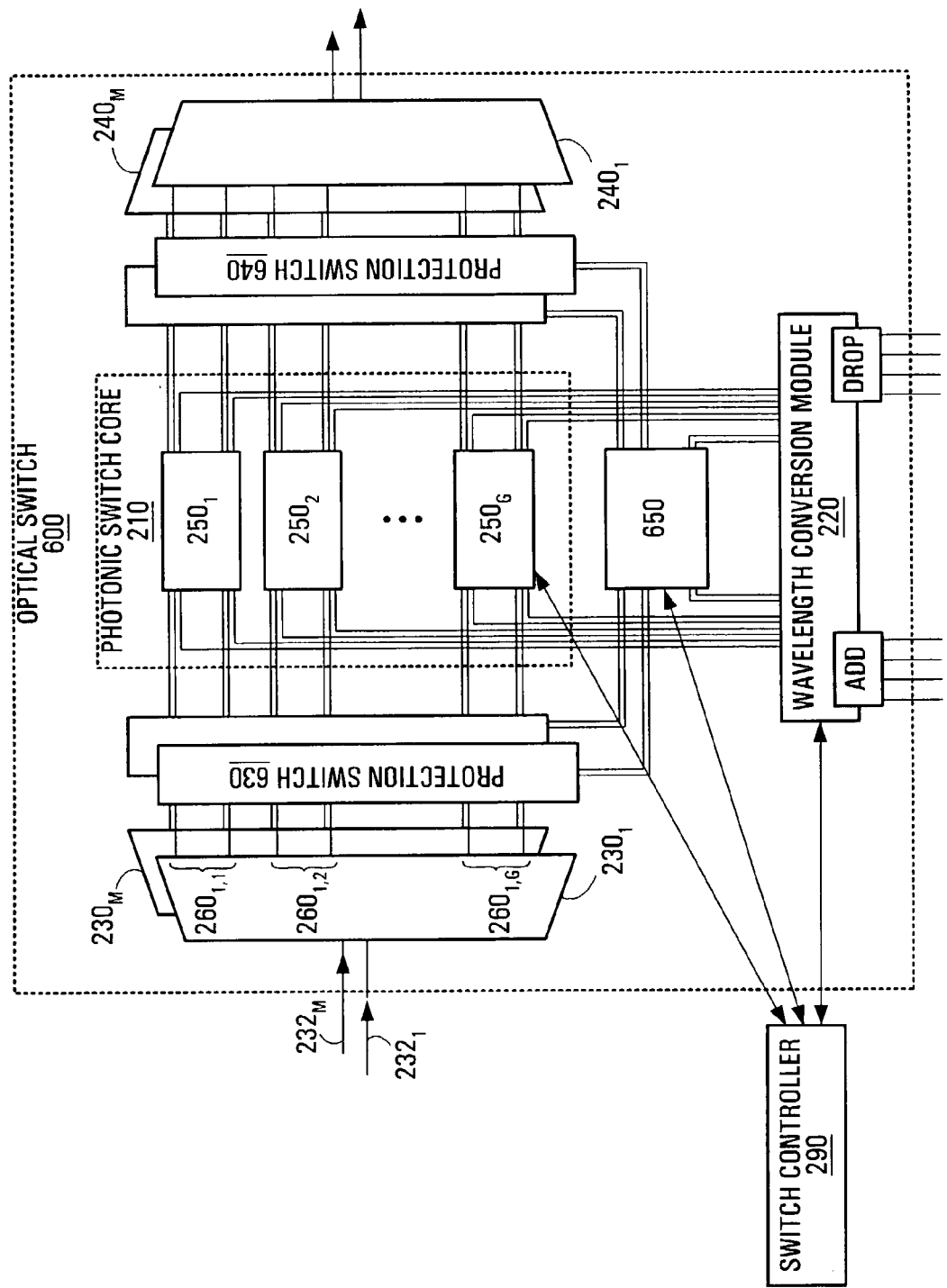
FIGS. 6–8 show alternative embodiments of the optical switch of FIG. 2.

The optical switch 200 can be provided with various enhancements and optional features as now described with reference to FIGS. 6, 7 and 8, although they need not be applied progressively in that order. For example, FIG. 6 shows an optical switch 600 that is provided with protection switching capability in addition to per-wavelength-group optical switching. A description of the protection switching capability has been provided in the context of a single-wavelength-plane switch in above-mentioned U.S. patent application Ser. No. 09/726,027.

Specifically, in order to provide protection against the possibility of a failure of one of the wavelength-group photonic switching modules $250_{1,2, \ldots ,G}$, an additional photonic switching module 650 can be provided. This would allow for a 1:G protection switching architecture. In order to implement this scheme, the $m^{th}$ line card of the switch 200, which already contains the $m^{th}$ WDD device $230_m$ and the $m^{th}$ WDM device $240_m$, is now also equipped with a respective input protection switch $630_m$ and a respective output protection switch $640_m$.

The input protection switch $630_m$ serves to intercept any of the G groups of carriers leading to the G wavelength-group photonic switching modules $250_{1,2, \ldots ,G}$ and to route the intercepted group to the protection photonic switching module 650. The output protection switches $640_{1,2, \ldots ,M}$ serve to inject the switched carriers arriving from the protection photonic switching module 650 into the various paths that the intercepted carriers would have followed, had they not been intercepted by the input protection switch $630_m$.

The protection switches $630_{1,2, \ldots ,M}$ can be implemented in many ways, such as through the use of a multi-port MEMS device as described in above-mentioned U.S. patent application Ser. No. 09/726,027. In normal operation, all carriers transit the MEMS from left to right and all MEMS mirrors do not obstruct the path of the incoming single-wavelength optical signals. In the event of a failure of one of the G wavelength-group photonic switching modules $250_{1,2, \ldots ,G}$, a group of MEMS mirrors associated with the carriers leading to the failed wavelength-group photonic switching module are raised into the optical paths transiting the protection switch 630 and thus deflect the intercepted incoming single-wavelength optical signals towards the protection photonic switching module 650. In order to enable the deflection, a sufficient number of mirrors is required in the $m^{th}$ protection switch $630_m$ to permit all of the optical carriers leading from the $m^{th}$ WDD device $230^m$ to any one of the wavelength-group photonic switch modules $250_{1,2, \ldots ,G}$ to be diverted towards the protection photonic switching module 650. Additional mirrors may be provided so as to permit test signals to be injected into the failed wavelength-group photonic switch module in order to confirm that it has failed, and to test its replacement before returning to service. Control of the protection photonic switching module 650 and the protection switches $630_{1,2,\ldots,G}$, $640_{1,2,\ldots,G}$, is provided by the switch controller 290.

In addition, it is desirable that the ongoing (densely) wavelength division multiplexed carriers leaving the switch 200 do so at approximately equal powers per optical carrier. It is especially important to do so in situations where the carriers in any given outgoing multiplexed optical signal have completely different ancestries coming into the switch 200. FIG. 7 shows a switch 700 that is similar to the optical switch 600 of FIG. 6 but which has been enhanced with optical carrier power flattening functionality, which ensures that each optical carrier in a DWDM group is transmitted with the same power level. A description of the optical carrier power flattening capability has been provided in the context of a single-wavelength-plane switch in aforementioned U.S. patent application Ser. No. 09/580,495.

Figure 7:
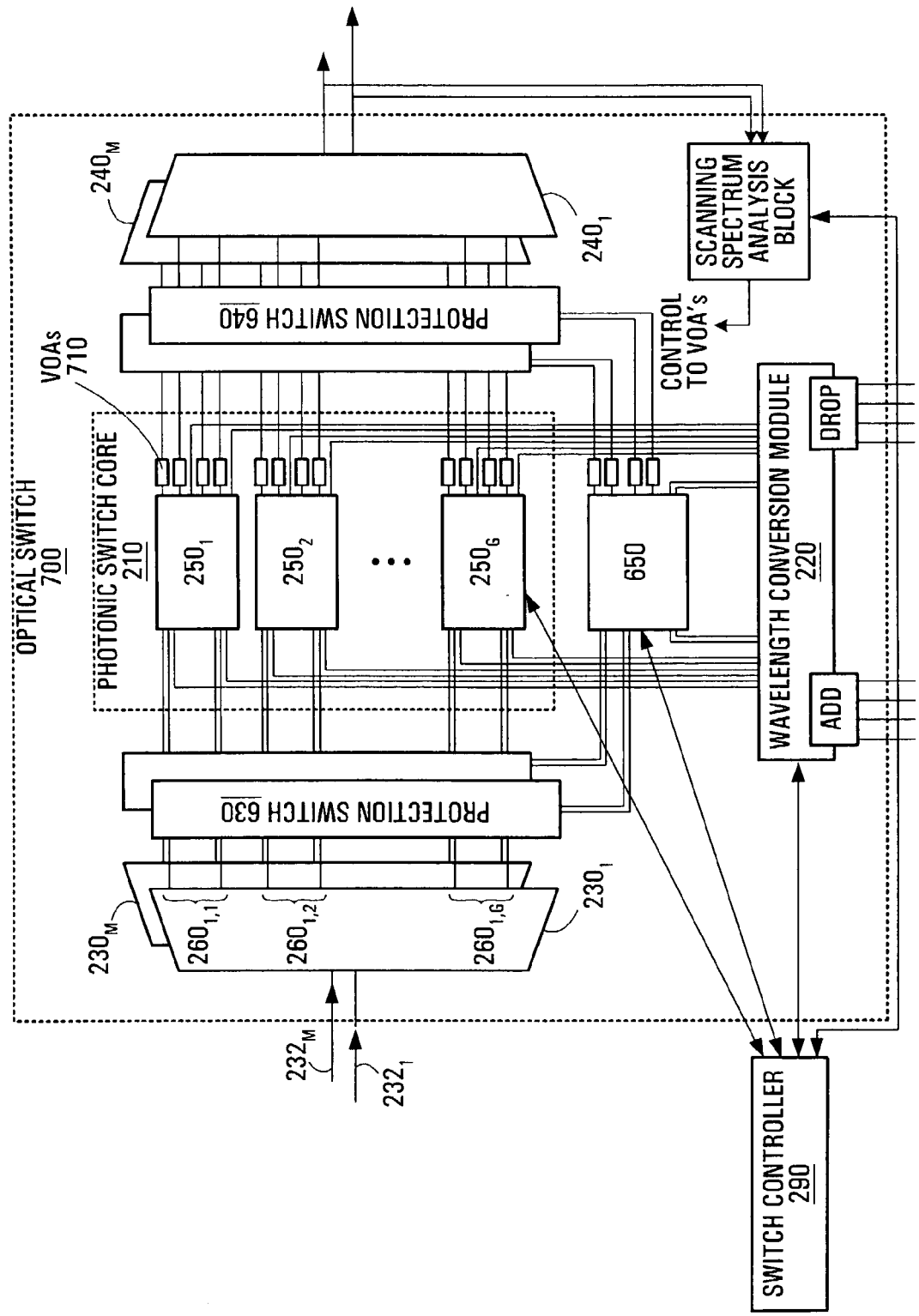

Specifically, the switch 700 in FIG. 7 includes a set of variable optical amplifiers/attenuators (VOAs, collectively denoted 710) are placed in series with each of the external output ports of the wavelength-group photonic switching modules $250_{1,2,\ldots,G}$. The VOAs 710 may be located on the switch fabric cards or trib cards. The attenuation or amplification of each of the VOAs 710 is controlled by a feedback loop, based on tapping the output multi-wavelength optical signal in an asymmetric (e.g. 5%) tap and feeding a spectrum analysis block. The outputs of power monitors in the spectrum analysis block are used to adjust the amplification or attenuation of each of the VOAs 710 to a level that results in the required optical power in each of the carriers in the output multi-wavelength optical signals and hence in a flat output spectrum.

Figure 8:
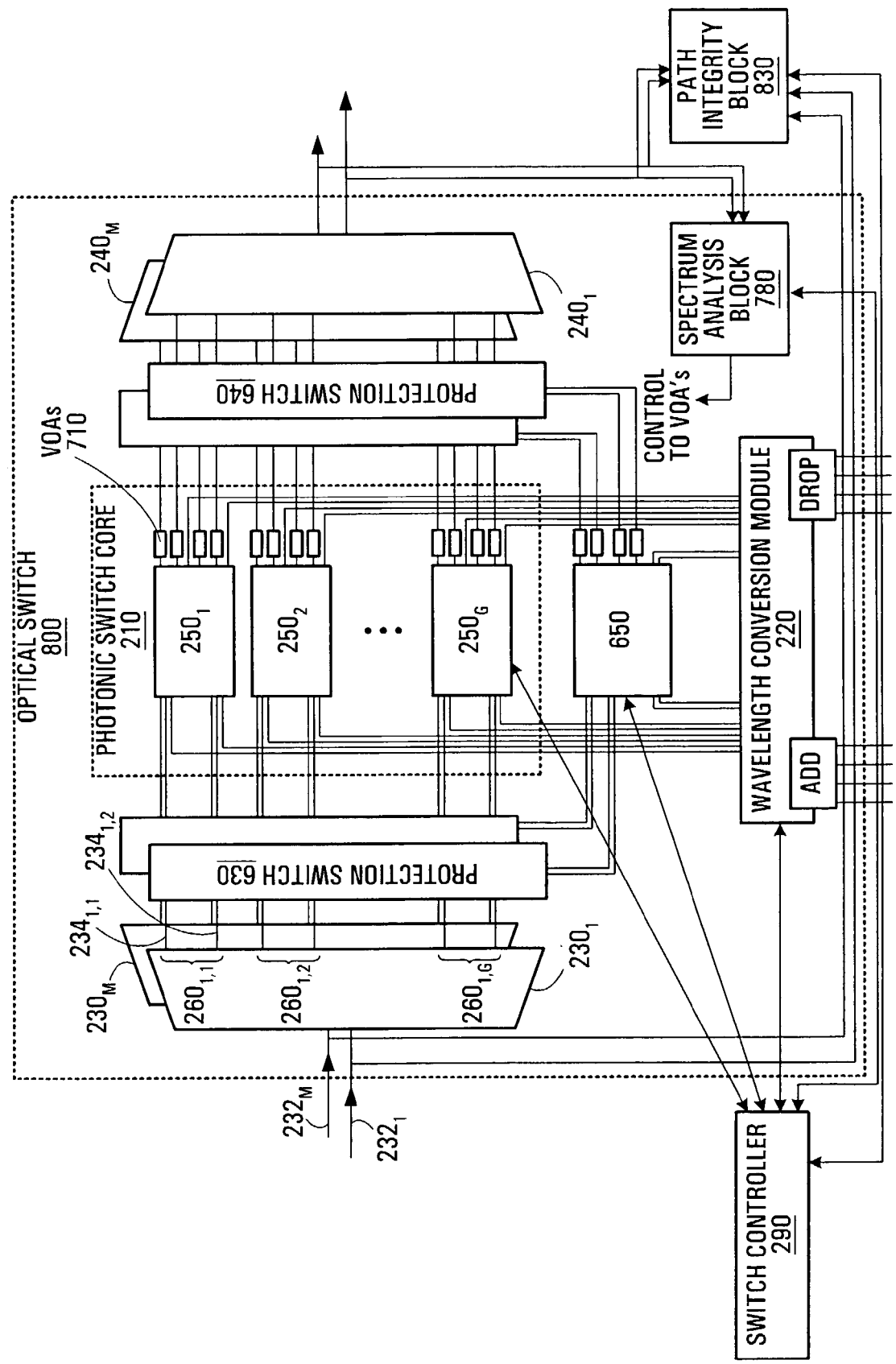

Yet another variation of the present invention, an embodiment of which is shown in FIG. 8, provides an optical switch 800 that has the per-wavelength-group switching functionality of switch 200, the protection switching functionality of switch 600 and the optical carrier power flattening functionality of switch 700. In addition, the optical switch 800 features connection verification capabilities, as described in above-mentioned U.S. patent application Ser. No. 60/207, 292 in the context of a single-wavelength plane switch. Specifically, the switch 800 is equipped with a set of optical splitters at an input end, each associated with a corresponding optical fiber transporting an individual incoming multi-wavelength optical signal to the photonic switch core 210.

The switch 800 also utilizes optical splitters at an output end in order to recover a portion of the power of each outgoing multi-wavelength optical signal optical signal, which can then be optically demultiplexed, thus affording visibility into the set of single-wavelength optical signals which exit the external output ports of the photonic switch core 210. Moreover, additional optical splitters (not shown) may be provided at the input to the wavelength conversion module 220, thereby to provide full visibility of all of the single-wavelength optical signals having been switched by the photonic switch core 210.

The switch 800 is further equipped with a path integrity analyzer 830 connected to the splitters and to the splitters. The path integrity analyzer 830 can thus ascertain the integrity of the connection involving each individual single-wavelength optical signal at the output of the switch 800 by comparing it to the incoming single-wavelength optical signal from which it is expected to be derived, as determined from the connection map received from the switch controller 290 (not shown in FIG. 8). Those skilled in the art will appreciate that the details of the path integrity analyzer 830 are of little significance to this embodiment, as path integrity may be assessed in a number of ways such as by performing a comparison of detected and expected test signals (see above-mentioned U.S. patent application Ser. No. 60/207, 292) or by evaluating the strength of a correlation existing between pairs of input and output signals (see above-mentioned U.S. patent application Ser. No. 09/742,232).

Of course, those skilled in the art will appreciate that an optical switch having any combination of the individual additional features described with reference to FIGS. 6, 7 and 8 is within the scope of the present invention.

While specific embodiments of the present invention have been described and illustrated, it will be apparent to those skilled in the art that numerous modifications and variations can be made without departing from the scope of the invention as defined in the appended claims.

I claim:

1. Apparatus for switching optical signals, comprising:
   a) a plurality of external inputs, each external input carrying light that occupies a wavelength associated to that external input;
   b) a plurality of external outputs, each external output carrying light that occupies a wavelength associated to that external output;
   c) a wavelength conversion entity having a plurality of inputs and a plurality of groups of outputs, each output in each particular one of the groups of outputs carrying light that occupies a wavelength in a group of wavelengths associated to the particular one of the groups of outputs;
   d) a plurality of core switching entities, each core switching entity associated to a respective set of at least two wavelengths, each said core switching entity including:
      i) a plurality of first core inputs respectively connected to those external inputs for which the associated wavelength belongs to the respective set of at least two wavelengths;
      ii) a plurality of second core inputs respectively connected to those outputs of said wavelength conversion entity belonging to the group of outputs for which the associated group of wavelengths belongs to the respective set of at least two wavelengths;
      iii) a plurality of first core outputs respectively connected to those external outputs for which the associated wavelength belongs to the respective set of at least two wavelengths; and
      iv) a plurality of second core outputs respectively connected to individual ones of the inputs of said wavelength conversion entity;
   a) each core switching entity being capable of selectably transferring optical signals from any of its first core inputs to any of its second core outputs;
   f) each core switching entity further being capable of selectably transferring optical signals from any of its second core inputs to any of its first core outputs.

2. Apparatus as defined in claim 1, each core switching entity further being capable of selectably transferring optical signals from any particular one of its first core inputs to any of its first core outputs connected to an external output that is associated to the same wavelength as the wavelength to which is associated the external input connected to the particular one of the first core inputs.

3. Apparatus as defined in claim 2, said wavelength conversion entity being capable of selectably transferring an optical signal from any of its inputs to any of its outputs upon performing a conversion of the wavelength occupied by that optical signal.

4. Apparatus as defined in claim 3, further comprising a plurality of wavelength division demultiplexing (WDD)

devices, each WDD device having an input and a plurality of outputs, the outputs of each WDD device being respectively connected to a subset of said external inputs associated to distinct wavelengths.

5. Apparatus as defined in claim 4, further comprising a plurality of wavelength division multiplexing (WDM) devices, each WDM device having an output and a plurality of inputs, the inputs of each WDM device being respectively connected to a subset of said external outputs associated to distinct wavelengths.

6. Apparatus as defined in claim 5, wherein each said group of wavelengths includes at least two wavelengths.

7. Apparatus as defined in claim 5, wherein the wavelengths belonging to each said group of wavelengths jointly occupy a respective region of the optical spectrum and wherein the regions occupied by the wavelengths in each group of wavelengths are mutually disjoint.

8. Apparatus as defined in claim 5, wherein the wavelengths belonging to each said group of wavelengths are dynamically time-varying.

9. Apparatus as defined in claim 5, further comprising a switch controller connected to the core switching entities, wherein the switch controller is instrumental to control switching operations effected by the core switching entities.

10. Apparatus as defined in claim 9, wherein the switch controller is further connected to the wavelength conversion entity, wherein the switch controller is further instrumental to control switching operations effected by the wavelength conversion entity.

11. Apparatus as defined in claim 1, wherein each said core switching entity is a photonic switching module.

12. Apparatus as defined in claim 1, wherein said wavelength conversion entity comprises:
  a) a bank of opto-electronic converters connected to the inputs of the wavelength conversion entity;
  b) an electrical switch having a plurality of inputs and a plurality of outputs and capable of establishing connections between individual ones of its inputs and corresponding ones of its outputs, the inputs of the electrical switch being connected to the opto-electronic converters; and
  c) a bank of electro-optic converters connected to the outputs of the electrical switch and having a plurality outputs corresponding to the wavelength conversion module.

13. Apparatus as defined in claim 12, wherein said wavelength conversion entity further comprises:
  a) a photonic switch having a plurality of inputs and a plurality of outputs, the inputs of said photonic switch being connected to the bank of electro-optical converters, said photonic switch being capable of establishing connections between individual ones of its inputs and corresponding ones of its outputs.

14. Apparatus as defined in claim 13, the number of electro-optical converters being fewer than the number of inputs of the photonic switch, the electrical switch being adapted to concentrate the signals at its inputs towards those of its outputs connected to one of the electro-optical converters.

15. Apparatus as defined in claim 1, wherein said wavelength conversion entity comprises:
  a) a bank of opto-electronic converters, each opto-electronic converter having an input corresponding to one of the inputs of the wavelength conversion entity, each opto-electronic converter further having an output;
  b) a bank of electro-optical converters each having an input connected to the output of a respective one of the opto-electronic converters, each electro-optical converter being capable of converting the electrical signal at its input into an optical signal of a desired wavelength;
  c) a photonic switch connected to the electro-optical converters, the photonic switch having a plurality of inputs and a plurality of outputs, the photonic switch being capable of establishing connections between individual ones of its inputs and corresponding ones of its outputs, each output of the photonic switch corresponding to a respective one of the outputs of the wavelength conversion entity.

16. Apparatus as defined in claim 1, wherein said wavelength conversion entity comprises:
  a) a photonic switch having a plurality of inputs and a plurality of outputs, the photonic switch being capable of establishing connections between individual ones of its inputs and corresponding ones of its outputs;
  b) a bank of opto-electronic converters connected to the outputs of the photonic switch;
  c) a bank of electro-optical converters connected to the bank of opto-electronic converters.

17. Apparatus as defined in claim 16, said photonic switch being a first photonic switch, the said wavelength conversion entity comprises:
  a) second photonic switch having a plurality of inputs and a plurality of outputs, the inputs of said second photonic switch being connected to the bank of electro-optical converters, said second photonic switch being capable of establishing connections between individual ones of its inputs and corresponding ones of its outputs.

18. Apparatus as defined in claim 17, the number of opto-electronic converters and electro-optical converters being fewer than the number of outputs of the first photonic switch, the first photonic switch being adapted to concentrate the signals at its inputs towards those of its outputs connected to one of the opto-electronic converters.

19. Apparatus as defined in claim 1, further comprising a plurality of line cards, wherein the WDD devices and the WDM devices are distributed amongst the line cards.

20. Apparatus as defined in claim 1, wherein said wavelength conversion entity comprises a plurality of wavelength conversion sub-entities, each wavelength conversion sub-entity comprising:
  a) a plurality of inputs corresponding to a respective subset of the plurality of the inputs of said wavelength conversion entity
  b) a plurality of outputs corresponding to a respective subset of the outputs in each of the groups of outputs of said wavelength conversion entity;
  c) wherein each said wavelength conversion sub-entity is capable of selectably transferring an optical signal from any of its inputs to any of its outputs upon performing a conversion of the wavelength occupied by that optical signal.

21. A method of switching a plurality of incoming optical signals occupying individual wavelengths of light, comprising:
  a) grouping the signals into signal groups, each signal group including optical signals occupying at least two wavelengths associated with that signal group;
  b) receiving the signals from each respective signal group at a respective core switching entity, each core switching entity comprising:
    (1) a plurality of first core inputs, each core input being operative for receiving a signal carrying light that occupies a wavelength associated to that core input, the wavelength belonging to the at least two wavelengths of the respective signal group;

(2) a plurality of second core inputs for receiving signals from a wavelength conversion entity associated with the respective signal group, the signals carrying light belonging to any wavelength associated with that signal group;

(3) a plurality of first core outputs, each core output being operative for outputting a signal carrying light that occupies a wavelength associated to that core output, the wavelength belonging to the at least two wavelengths of the respective signal group; and (4) a plurality of second core outputs for issuing signals to the wavelength conversion entity associated with the respective signal group, the signals carrying light belonging to any wavelength associated with that signal group:

c) using the wavelength conversion entities associated with each respective signal group for wavelength conversion of a subset of the incoming signals occupying wavelengths associated with the given signal group.

22. Apparatus for switching a plurality of incoming optical signals occupying individual wavelengths of light, comprising:

a) means for grouping the signals into signal groups, each signal group including optical signals occupying at least two wavelengths associated with that signal group;

b) means for receiving the signals from each respective signal group at a respective core switching entity, each core switching entity comprising:

(1) a plurality of first core inputs, each core input being operative for receiving a signal carrying light that occupies a wavelength associated to that core input, the wavelength belonging to the at least two wavelengths of the respective signal group;

(2) a plurality of second core inputs for receiving signals from a wavelength conversion entity associated with the respective signal group, the signals carrying light belonging to any wavelength associated with that signal group;

(3) a plurality of first core outputs, each core output being operative for outputting a signal carrying light that occupies a wavelength associated to that core output, the wavelength belonging to the at least two wavelengths of the respective signal group; and (4) a plurality of second core outputs for issuing signals to the wavelength conversion entity associated with the respective signal group, the signals carrying light belonging to any wavelength associated with that signal group;

c) means for using the wavelength conversion entities associated with each respective signal group for wavelength conversion of a subset of the incoming signals occupying wavelengths associated with the given signal group.

* * * * *